United States Patent
Qu et al.

(10) Patent No.: US 11,757,688 B2
(45) Date of Patent: Sep. 12, 2023

(54) SEQUENCE-BASED SIGNAL PROCESSING METHOD AND APPARATUS

(71) Applicant: Huawei Technologies Co., Ltd., Shenzhen (CN)

(72) Inventors: Bingyu Qu, Beijing (CN); Hao Sun, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/734,885

(22) Filed: May 2, 2022

(65) Prior Publication Data

US 2022/0407753 A1 Dec. 22, 2022

Related U.S. Application Data

(63) Continuation of application No. 16/871,965, filed on May 11, 2020, now Pat. No. 11,362,873, which is a
(Continued)

(30) Foreign Application Priority Data

Aug. 11, 2017 (CN) .......................... 201710687282.0

(51) Int. Cl.
H04L 27/26 (2006.01)
H04W 72/21 (2023.01)
H04L 5/00 (2006.01)

(52) U.S. Cl.
CPC ........ *H04L 27/2613* (2013.01); *H04L 27/261* (2013.01); *H04L 27/262* (2013.01);
(Continued)

(58) Field of Classification Search
CPC . H04L 27/2613; H04L 27/261; H04L 27/262; H04L 5/0048; H04L 5/0051;
(Continued)

(56) References Cited

U.S. PATENT DOCUMENTS

2004/0196916 A1 10/2004 Bohnke et al.
2008/0049851 A1 2/2008 Nangia et al.
(Continued)

FOREIGN PATENT DOCUMENTS

CN 101507222 A 8/2009
CN 101515809 A 8/2009
(Continued)

OTHER PUBLICATIONS

"Short duration PUCCH for smaller payload sizes," 3GPP TSG RAN WG1 Meeting #88, R1-1701645, Athens, Greece, pp. 1-8, 3rd Generation Partnership Project—Valbonne, France (Feb. 13-17, 2017).
(Continued)

*Primary Examiner* — Jean B Corrielus
(74) *Attorney, Agent, or Firm* — Leydig, Voit & Mayer, Ltd.

(57) ABSTRACT

A sequence-based signal processing method and apparatus are provided. A sequence meeting a requirement for sending a signal by using a physical uplink control channel (PUCCH) is determined. The sequence is a sequence $\{f_n\}$ consisting of 12 elements, $f_n$ represents an element in the sequence $\{f_n\}$, and the determined sequence $\{f_n\}$ is a sequence meeting a preset condition. Then, the 12 elements in the sequence $\{f_n\}$ are respectively mapped to 12 subcarriers, to generate a first signal, and the first signal is sent. By using the determined sequence, when the signal is sent by using the PUCCH, a low correlation between sequences can be maintained, and a relatively small peak-to-average power ratio (PAPR) value and a relatively small cubic metric (CM) value can be maintained. Therefore, a requirement of a communication application environment in which the signal is sent by using the PUCCH is met.

30 Claims, 7 Drawing Sheets

Related U.S. Application Data continuation of application No. 16/248,486, filed on Jan. 15, 2019, now Pat. No. 10,673,669, which is a continuation of application No. PCT/CN2018/095948, filed on Jul. 17, 2018.

(52) U.S. Cl.
CPC ........... *H04W 72/21* (2023.01); *H04L 5/0048* (2013.01); *H04L 5/0051* (2013.01)

(58) Field of Classification Search
CPC ............... H04L 5/0053; H04L 27/2626; H04L 27/2647; H04W 72/21
See application file for complete search history.

(56) References Cited

U.S. PATENT DOCUMENTS

| | | | |
|---|---|---|---|
| 2009/0080569 | A1 | 3/2009 | Han et al. |
| 2010/0067461 | A1 | 3/2010 | Kwak et al. |
| 2010/0142476 | A1 | 6/2010 | Jiang et al. |
| 2010/0322066 | A1 | 12/2010 | Chun et al. |
| 2011/0002322 | A1* | 1/2011 | Kim ..................... H04J 11/0023 370/344 |
| 2012/0076089 | A1 | 3/2012 | Kawamura et al. |
| 2012/0076100 | A1 | 3/2012 | Noh et al. |
| 2013/0128833 | A1 | 5/2013 | Lee et al. |
| 2014/0044064 | A1 | 2/2014 | Nangia et al. |
| 2014/0126517 | A1 | 5/2014 | Choi et al. |
| 2014/0269519 | A1 | 9/2014 | Shan et al. |
| 2017/0134129 | A1 | 5/2017 | You et al. |
| 2018/0191423 | A1 | 7/2018 | Qu et al. |
| 2018/0198658 | A1 | 7/2018 | Zhang et al. |
| 2018/0220305 | A1* | 8/2018 | Lei ......................... H04W 72/23 |
| 2019/0028224 | A1 | 1/2019 | Kim et al. |
| 2019/0229879 | A1* | 7/2019 | Yi ......................... H04W 24/08 |
| 2020/0287696 | A1 | 9/2020 | Han et al. |
| 2020/0296765 | A1* | 9/2020 | Kim .................. H04W 74/0833 |
| 2020/0305098 | A1* | 9/2020 | Kim .................. H04W 72/0446 |

FOREIGN PATENT DOCUMENTS

| | | | |
|---|---|---|---|
| CN | 101741793 | A | 6/2010 |
| CN | 101796789 | A | 8/2010 |
| CN | 102739597 | A | 10/2012 |
| CN | 103299556 | A | 9/2013 |
| CN | 103763297 | A | 4/2014 |
| CN | 104769537 | A | 7/2015 |
| CN | 106063355 | A | 10/2016 |
| CN | 106664281 | A | 5/2017 |
| CN | 106817331 | A | 6/2017 |
| CN | 108632002 | A | 10/2018 |
| CN | 109039979 | B | 9/2019 |
| CN | 110771109 | A | 2/2020 |
| CN | 109039978 | B | 3/2020 |
| JP | 2010538569 | A | 12/2010 |
| WO | 2008075881 | A2 | 6/2008 |
| WO | 2010124602 | A1 | 11/2010 |
| WO | 2016099057 | A1 | 6/2016 |

OTHER PUBLICATIONS

"3rd Generation Partnership Project; Technical Specification Group Radio Access Network; NR; Physical channels and modulation (Release 15)," 3GPP TS 38.211 V0.1.0, pp. 1-22, 3rd Generation Partnership Project—Valbonne, France (Jun. 2017).

"Structure of 1-symbol PUCCH for up to 2 bits," 3GPP TSG RAN WG1 Meeting #89, R1-1706950, Hangzhou, China, pp. 1-6, 3rd Generation Partnership Project—Valbonne, France (May 15-19, 2017).

"Short PUCCH for up to 2 UCI bits," 3GPP TSG RAN WG1 NR Ad-Hoc Meeting, Qingdao, R1-1709958, China, pp. 1-9, 3rd Generation Partnership Project—Valbonne, France (Jun. 27-30, 2017).

"Channelization of 1-symbol short PUCCH with 1 or 2 bits payload," 3GPP TSG RAN WG1 NR Ad-Hoc#2, R1-1711188, Qingdao, P.R. China, pp. 1-12, 3rd Generation Partnership Project—Valbonne, France (Jun. 27-30, 2017).

Huawei, HiSilicon, "Short duration PUCCH for small payload sizes," 3GPP TSG RAN WG1 Meeting #88bis, Spokane, USA, R1-1704206, total 6 pages, 3rd Generation Partnership Project, Valbonne, France (Apr. 3-7, 2017).

"3rd Generation Partnership Project; Technical Specification Group Radio Access Network; Evolved Universal Terrestrial Radio Access (E-UTRA); Physical channels and modulation (Release 14)," 3GPP TS 36.211 V14.3.0, total 195 pages, 3rd Generation Partnership Project, Valbonne, France (Jun. 2017).

"UL DMRS design for data transmission," 3GPP TSG RAN WG1 Meeting #88bis, Spokane, USA, R1-1704237, Total 4 pages, 3rd Generation Partnership Project, Valbonne, France (Apr. 3-7, 2017).

"NR short PUCCH structure for up to 2 bit UCI," 3GPP TSG RAN WG1 Meeting #89, Hangzhou, P.R. China, R1-1707168, Total 8 pages, 3rd Generation Partnership Project, Valbonne, France (May 15-19, 2017).

"On UL DMRS design," 3GPP TSG-RAN WG1 NR Ad-Hoc#2, Qingdao, P.R. China, R1-1711045, Total 8 pages, 3rd Generation Partnership Project, Valbonne, France (Jun. 27-30, 2017).

\* cited by examiner

SEQUENCE-BASED SIGNAL PROCESSING METHOD AND APPARATUS

CROSS-REFERENCE TO RELATED APPLICATIONS

This application is a continuation of U.S. patent application Ser. No. 16/871,965, filed on May 11, 2020, now U.S. Pat. No. 11,362,873, which is a continuation of U.S. patent application Ser. No. 16/248,486, filed on Jan. 15, 2019, now U.S. Pat. No. 10,673,669, which is a continuation of International Application No. PCT/CN2018/095948, filed on Jul. 17, 2018, which claims priority to Chinese Patent Application No. 201710687282.0, filed on Aug. 11, 2017. All of the afore-mentioned patent applications are hereby incorporated by reference in their entireties.

TECHNICAL FIELD

Embodiments of this application relate to the field of communications technologies, and in particular, to a sequence-based signal processing method and apparatus.

BACKGROUND

In a Long Term Evolution (LTE) system, a physical uplink control channel (PUCCH) occupies, for sending uplink control information (UCI), 13 or 14 orthogonal frequency division multiplexing (OFDM) symbols or discrete Fourier transform spread orthogonal frequency division multiplexing (DFT-s-OFDM) symbols in one subframe. A PUCCH format 1a/1b is used to transmit response information of 1 or 2 bits, and the PUCCH format 1a/1b is sent in a sequence modulation manner. Generally, in the LTE system, to avoid interference between PUCCHs in two neighboring cells, sequences selected for the neighboring cells need to have a low correlation with each other. To expand coverage of a PUCCH, it is necessary to ensure that all sent signals have relatively small peak-to-average power ratio (PAPR) values and cubic metric (CM) values.

Currently, in the LTE system, there are 30 existing length-12 root sequences used for sending UCI and a demodulation reference signal (DMRS) by using an LTE PUCCH format 1a/1b. However, in preliminary design of the LTE system, optimization of the CM value and the sequence correlation is mainly considered for the 30 length-12 root sequences. A relationship between the CM value and the PAPR value is: when the PAPR value is small, the CM value is certainly small; but when the CM value is small, the PAPR value is not necessarily small. Therefore, it cannot be ensured that PAPR values are small when it is ensured that all the 30 length-12 root sequences have relatively small CM values and low correlations.

SUMMARY

In view of this, embodiments of this application provide a sequence-based signal processing method and apparatus, to resolve a prior-art problem that 30 existing root sequences cannot meet a requirement of an existing communication application environment in which a signal is sent by using a PUCCH.

The embodiments of this application provide the following technical solutions:

A first aspect of the embodiments of this application provides a sequence-based signal processing method, including:

determining a sequence $\{f_n\}$ consisting of 12 elements, where $f_n$ represents an element in the sequence $\{f_n\}$, the sequence $\{f_n\}$ is a sequence meeting a preset condition, the preset condition is $f_n = A \cdot x_n \cdot \exp(2\pi \cdot j \cdot a \cdot n)$, a value of n is 0, 1, 2, 3, 4, 5, 6, 7, 8, 9, 10, 11, A is a non-zero complex number, a is a real number, $j = \sqrt{-1}$, $\exp(2\pi \cdot j \cdot a \cdot n)$ represents $e^{2\pi \cdot j \cdot a \cdot n}$, an element $x_n = u \cdot \exp(\pi \cdot j \cdot s_n/4)$, u is a non-zero complex number, and a sequence $\{s_n\}$ consisting of elements $s_n$ is a sequence in a first sequence set or an equivalent sequence of a sequence in a first sequence set, or a sequence in a second sequence set or an equivalent sequence of a sequence in a second sequence set, where sequences in the first sequence set include $\{-3, 1, 3, -1, 3, 1, -1, -1, -1, -1, 1, 1\}$, $\{3, 1, 3, 1, 3, 1, 3, -3, -1, -3, 3, 1\}$, $\{3, -1, 3, -1, -1, -1, -1, 3, 3, -1, -1, 3\}$, $\{1, 1, -1, -1, 3, 3, -3, -3, -1, 3, -1, 3\}$, $\{-1, -3, -3, 3, -3, 3, -1, -3, 1, 3, -3, -1\}$, $\{1, 3, 1, -1, 1, -1, -3, -1, 1, -1, 1, 3\}$, $\{-3, 3, 3, 1, -1, -3, 1, -3, -1, 1, 1, 3\}$, $\{-1, 1, 3, -3, -3, 3, 1, 3, 1, -3, 3\}$, $\{3, 1, 1, -1, -3, 1, -3, -1, 1, 3, 3, -3\}$, $\{-1, -3, 3, 1, 1, 3, 3, -3, 3, -3, 1, 3\}$, and $\{-1, -1, -3, -3, -3, -3, -1, 1, -3, 1, -1, 3\}$, and sequences in the second sequence set include $\{-1, -3, 3, -1, 3, 1, 1, 1, -3, -1, 1, 1\}$, $\{3, 1, -3, 1, 3, 1, -1, -1, 1, 3, 3, 3\}$, $\{-1, 3, 1, 3, 1, -1, -1, -1, 1, -3, -1, 1\}$, $\{1, 3, 3, -3, 1, 3, 1, 3, 3, 1, -1, -3\}$, $\{-3, 3, 3, 1, -1, 3, -3, -3, -3, -1\}$, $\{-1, 3, -1, -1, -1, 3, -1, 3, -1, -1, -3, -1, -1\}$, $\{3, 1, 3, -1, -3, -1, -1, -3, -3, -3\}$, $\{1, -3, 1, 1, -3, -3, -3, -3, 1, -3, -3, -3\}$, $\{-3, 3, 3, 3, -1, -1, 1, 1, -3, 1, 3, -3, 1\}$, $\{3, 3, 3, 1, -3, -3, 1, 3, -3, 1, -1, 1\}$, $\{1, -3, -1, 3, -1, -3, 3, 1, 1, 3, -3, -3\}$, $\{1, 3, -3, -1, -3, 3, 1, -1, -3, -1, -3, -1\}$, $\{-1, -3, 3, -1, -3, -3, -3, -1, -1, 1, -3\}$, $\{-1, 1, 3, -3, 1, -1, 1, -1, -1, -3, 1, -1\}$, $\{1, -3, 1, -1, -3, 1, 3, -3, 3, 3, 3, -3\}$, $\{-1, 1, 3, -3, 3, 1, -1, -3, -3, -3, -3\}$, $\{3, -1, -3, 3, 3, -1, 3, -3, -3, -3\}$, $\{-1, 1, -3, -3, -3, -1, -1\}$, $\{-1, 3, -3, -1, 3, 1, -1, -3, -3, -3, -1, -1\}$, $\{-1, -1, 3, 3, 3, 3, -1, 3, -1, 3\}$, $\{-3, 1, 1, -1, 3, -1, -3, -1, -3\}$, $\{-3, -1, -3, -1, 3, -3, 3, -3, -1, -1\}$, $\{1, 1, 1, 3, -1, -1, 3, 1, -1, 3, -3, 3\}$, and $\{-3, 1, -3, 1, 3, 3, -1, -1, -3, -3, -1, -1\}$; and mapping the sequence $\{f_n\}$ consisting of the 12 elements to 12 subcarriers, to generate a first signal, and sending the first signal.

In the foregoing solution, with the determined sequence, when a signal is sent by using a PUCCH, a low correlation between sequences can be maintained, and a relatively small PAPR value and a relatively small CM value can be maintained. Therefore, a requirement of a communication application environment in which the signal is sent by using the PUCCH is met.

In a possible design, the first signal is a reference signal, or the first signal is a signal used to carry communication information.

In a possible design, a sequence $\{s_n\}$ consisting of elements $s_n$ is a sequence in a third sequence set or an equivalent sequence of a sequence in a third sequence set. For sequences in the third sequence set, refer to description of embodiments.

In a possible design, a sequence $\{s_n\}$ consisting of elements $s_n$ is a sequence in a fourth sequence set or an equivalent sequence of a sequence in a fourth sequence set. For sequences in the fourth sequence set, refer to description of embodiments.

In a possible design, a sequence $\{s_n\}$ consisting of elements $s_n$ is a sequence in a fifth sequence set or an equivalent sequence of a sequence in a fifth sequence set. For sequences in the fifth sequence set, refer to description of embodiments.

In a possible design, an $\{s_n\}$ set that includes a sequence $\{s_n\}$ consisting of elements $s_n$ is a subset in a sixth sequence set or a subset in a set including equivalent sequences of sequences in the sixth sequence set, or a subset in a seventh sequence set or a subset in a set including equivalent sequences of sequences in the seventh sequence set, or a subset in an eighth sequence set or a subset in a set including equivalent sequences of sequences in the eighth sequence set, and the $\{s_n\}$ set is a set of sequences used by a communications system. For the sequences in the sixth sequence set, the sequences in the seventh sequence set, and the sequences in the eighth sequence set, refer to description of embodiments.

In a possible design, the equivalent sequence is $\{q_n\}$, and an element $q_n$ in the equivalent sequence $\{q_n\}$ meets a $p_n = s_n + u_n \pmod 8$. For a sequence $\{u_n\}$ consisting of elements $u_n$, refer to description of embodiments.

In a possible design, the respectively mapping the 12 elements in the sequence $\{f_n\}$ to 12 subcarriers includes: respectively mapping the 12 elements in the sequence $\{f_n\}$ to 12 consecutive subcarriers; or respectively mapping the 12 elements in the sequence $\{f_n\}$ to 12 non-consecutive and equally spaced subcarriers; or respectively mapping the 12 elements in the sequence $\{f_n\}$ to a first subcarrier group and a second subcarrier group, where the first subcarrier group and the second subcarrier group each include six consecutive subcarriers, and a spacing between the first subcarrier group and the second subcarrier group includes at least one or five subcarriers; or respectively mapping the 12 elements in the sequence $\{f_n\}$ to a third subcarrier group and a fourth subcarrier group, where the third subcarrier group and the fourth subcarrier group each include six non-consecutive and equally spaced subcarriers, and a spacing between the third subcarrier group and the fourth subcarrier group includes at least one or five subcarriers.

A second aspect of the embodiments of this application provides a sequence-based signal processing method. The signal processing method includes:

receiving a first signal carried on 12 subcarriers; obtaining 12 elements in a sequence $\{f_n\}$, where the first signal is generated by mapping the sequence $\{f_n\}$ consisting of the 12 elements to the 12 subcarriers, $f_n$ is an element in the sequence $\{f_n\}$, the sequence $\{f_n\}$ is a sequence meeting a preset condition, the preset condition is $f_n = A \cdot x_n \cdot \exp(2\pi \cdot j \cdot a \cdot n)$, a value of n is 0, 1, 2, 3, 4, 5, 6, 7, 8, 9, 10, 11, A is a non-zero complex number, a is a real number, $j = \sqrt{-1}$, $\exp(2\pi \cdot j \cdot a \cdot n)$ represents $e^{2\pi \cdot j \cdot a \cdot n}$, an element $x_n = u \cdot \exp(\pi \cdot j \cdot s_n / 4)$, u is a non-zero complex number, and a sequence $\{s_n\}$ consisting of elements $s_n$ is a sequence in a first sequence set or an equivalent sequence of a sequence in a first sequence set, or a sequence in a second sequence set or an equivalent sequence of a sequence in a second sequence set, where sequences in the first sequence set include {−3, 1, 3, −1, 3, 1, −1, −1, −1, 1, 1}, {3, 1, 3, 1, 3, 1, 3, −3, −1, −3, 3, 1}, {3, −1, 3, −1, −1, −1, −1, 3, 3, −1, −1, 3}, {1, 1, −1, −1, 3, 3, −3, −3, −1, 3, −1, 3}, {−1, −3, −3, 3, −3, 3, −1, −3, 1, 3, −3, −1}, {1, 3, 1, −1, 1, −1, −3, −1, 1, −1, 1, 3}, {−3, 3, 3, 1, −1, −3, 1, −3, 1, 1, 3}, {−1, 1, 3, −3, −3, 3, 3, 1, 3, 1, −3, 3}, {3, 1, 1, −1, −3, 1, −3, −1, 1, 3, 3, −3}, {−1, −3, 3, 1, 1, 3, 3, −3, 3, −3, 1, 3}, and {−1, −1, −3, −3, −3, −3, −1, 1, −3, 1, −1, 3}, and sequences in the second sequence set include {−1, −3, 3, −1, 3, 1, 1, 1, −3, −1, 1, 1}, {3, 1, −3, 1, 3, 1, −1, −1, 1, 3, 3, 3}, {−1, 3, 1, 3, 1, −1, −1, −1, 1, −3, −1, 1}, {1, 3, 3, −3, 1, 3, 1, 3, 3, 1, −1, −3}, {−3, 3, 3, 1, −1, 3, −1, 3, −3, −3, −3, −1}, {−1, 3, −1, −1, −1, 3, −1, 3, 3, −1, −1, −1}, {3, 1, 3, −1, −3, 3, −1, −1, 3, −3, −3, −3}, {1, −3, 1, 1, −3, −3, −3, −3, 1, −3, −3, −3}, {−3, 3, 3, 3, −1, −1, 1, 1, −3, 1, 3, −1}, {3, 3, 3, 1, −3, −3, 1, 3, −3, 1, −1, 1}, {1, −3, −1, 3, −1, −3, 3, 1, 1, 3, −3, −3}, {1, 3, −3, −1, −3, 3, 1, −1, −3, −1, −3, −1}, {−1, −3, 3, −1, −3, −3, −3, −1, 1, −1, 1, −3}, {−1, 1, 3, −3, 1, −1, 1, −1, −1, −3, 1, −1}, {1, −3, 1, −1, −3, 1, 3, −3, 3, 3, 3, −3}, {−1, 1, 3, −3, 3, 1, −1, −3, −1, −3, −1, −3}, {3, −1, −3, 3, 3, −1, 3, −3, −3, −3, −1, 1}, {−1, 3, −3, −1, 3, 1, −1, −3, −3, −3, −1, −1}, {−1, −1, 3, 3, 3, 3, 3, −1, 3, −1, 3}, {−3, 1, 1, −1, 3, −1, −3, −1, −3, −3, −1, 1}, {3, −1, −3, 3, −1, 1, 3, −3, −3, −3, 3, 3}, {−1, 3, −1, −1, 3, −1, 3, −1, −1, −1, −1}, {3, −1, −1, 3, 3, 3, 3, 3, −1, 3, −1}, {−1, 1, 3, −1, −3, 3, 1, −1, −3, −1, −3}, {−3, 1, 3, 1, 3, −3, −3, −3, 3, −1, −3, 3}, {−1, 3, −1, −3, 1, 3, −3, −3, −3, 1, 1, −1}, {3, 1, 1, −1, 3, 1, 3, 1, 1, 3, −3, −1}, {−1, −3, 1, −1, −3, −1, 3, −3, 3, −3, −1, −1}, {1, 1, 1, 3, −1, −1, 3, 1, −1, 3, −3, 3}, and {−3, 1, −3, 1, 3, 3, −1, −1, −3, −3, −1, −1}; and processing the first signal based on the 12 elements in the sequence $\{f_n\}$.

In the foregoing solution, with the determined sequence, when a signal is sent by using a PUCCH, a low correlation between sequences can be maintained, and a relatively small PAPR value and a relatively small CM value can be maintained. Therefore, a requirement of a communication application environment in which the signal is sent by using the PUCCH is met.

In a possible design, the first signal is a reference signal, or the first signal is a signal used to carry communication information.

In a possible design, the following is further included: a sequence $\{s_n\}$ consisting of elements $s_n$ is a sequence in a third sequence set or an equivalent sequence of a sequence in a third sequence set. For sequences in the third sequence set, refer to description in the specification.

In a possible design, a sequence $\{s_n\}$ consisting of elements $s_n$ is a sequence in a fourth sequence set or an equivalent sequence of a sequence in a fourth sequence set. For sequences in the fourth sequence set, refer to description in the specification.

In a possible design, a sequence $\{s_n\}$ consisting of elements $s_n$ is a sequence in a fifth sequence set or an equivalent sequence of a sequence in a fifth sequence set. For sequences in the fifth sequence set, refer to description in the specification.

In a possible design, an $\{s_n\}$ set that includes a sequence $\{s_n\}$ consisting of elements $s_n$ is a subset in a sixth sequence set or a subset in a set including equivalent sequences of sequences in the sixth sequence set, or a subset in a seventh sequence set or a subset in a set including equivalent sequences of sequences in the seventh sequence set, or a subset in an eighth sequence set or a subset in a set including equivalent sequences of sequences in the eighth sequence set, and the $\{s_n\}$ set is a set of sequences used by a communications system. For the sequences in the sixth sequence set, the sequences in the seventh sequence set, and the sequences in the eighth sequence set, refer to description in the specification.

In a possible design, the equivalent sequence is $\{q_n\}$, and an element $q_n$ in the equivalent sequence $\{q_n\}$ meets $q_n = s_n + u_n \pmod 8$. For a sequence $\{u_n\}$ consisting of elements $u_n$, refer to description in the specification.

In a possible design, the receiving a first signal carried on 12 subcarriers includes:

obtaining, on 12 consecutive subcarriers, the first signal on the 12 subcarriers; or obtaining, on 12 non-consecutive and equally spaced subcarriers, the first signal on the 12 subcarriers; or obtaining the first signal on the 12 subcarriers from a first subcarrier group and a second subcarrier group, where the first subcarrier group and the second subcarrier group each include six consecutive subcarriers, and a spacing between the first subcarrier group and the second subcarrier group includes at least one or five subcarriers; or obtaining the first signal on the 12 subcarriers from a third subcarrier group and a fourth subcarrier group, where the third subcarrier group and the fourth subcarrier group each include six non-consecutive and equally spaced subcarriers, and a spacing between the third subcarrier group and the fourth subcarrier group includes at least one or five subcarriers.

A third aspect of the embodiments of this application provides a sequence-based signal processing apparatus. The apparatus may be a network device or a terminal, or may be a chip in a network device or a terminal. The apparatus may include a processing unit and a transceiving unit. When the apparatus is the network device or the terminal, the processing unit may be a processor, and the transceiving unit may be a transceiver. The network device may further include a storage unit, and the storage unit may be a memory. The storage unit is configured to store an instruction, and the processing unit executes the instruction stored in the storage unit, so that the network device or the terminal performs a corresponding function in the first aspect. When the apparatus is the chip in the network device or the terminal, the processing unit may be a processor, and the transceiving unit may be an input/output interface, a pin, a circuit, or the like. The processing unit executes an instruction stored in a storage unit, so that the network device performs a corresponding function in the first aspect. The storage unit may be a storage unit (for example, a register or a cache) inside the chip, or may be a storage unit (for example, a read-only memory or a random access memory) that is in the network device or the terminal and that is outside the chip.

A fourth aspect of the embodiments of this application provides a sequence-based signal processing apparatus. The apparatus may be a network device or a terminal, or may be a chip in a network device or a terminal. The apparatus may include a processing unit and a transceiving unit. When the apparatus is the network device or the terminal, the processing unit may be a processor, and the transceiving unit may be a transceiver. The network device may further include a storage unit, and the storage unit may be a memory. The storage unit is configured to store an instruction, and the processing unit executes the instruction stored in the storage unit, so that the network device or the terminal performs a corresponding function in the second aspect. When the apparatus is the chip in the network device or the terminal, the processing unit may be a processor, and the transceiving unit may be an input/output interface, a pin, a circuit, or the like. The processing unit executes an instruction stored in a storage unit, so that the network device performs a corresponding function in the second aspect. The storage unit may be a storage unit (for example, a register or a cache) inside the chip, or may be a storage unit (for example, a read-only memory or a random access memory) that is in the network device or the terminal and that is outside the chip.

A fifth aspect of the embodiments of this application provides a communications system. The communications system includes the network device or the terminal provided in the third aspect of the embodiments of this application and the network device or the terminal provided in the fourth aspect of the embodiments of this application.

A sixth aspect of the embodiments of this application provides a computer readable storage medium that includes an instruction. When the instruction is run on a computer, the computer performs the method according to the foregoing aspects.

A seventh aspect of the embodiments of this application provides a computer program product that includes an instruction. When the instruction is run on a computer, the computer performs the method according to the foregoing aspects.

An eighth aspect of the embodiments of this application provides a chip system. The chip system includes a processor, which is configured to support a communications device in performing a related function in the foregoing aspects, for example, generating or processing related data and/or information in the foregoing methods. In a possible design, the chip system further includes a memory. The memory is configured to store a necessary program instruction and necessary data in a network device and a terminal. The chip system may include a chip or may include a chip and another discrete component.

According to the sequence-based signal processing method and apparatus provided in the embodiments of this application, a sequence meeting a requirement for sending a signal by using a PUCCH is determined. The sequence is a sequence $\{f_n\}$ consisting of 12 elements, $f_n$ represents an element in the sequence $\{f_n\}$, and the determined sequence $\{f_n\}$ is a sequence meeting a preset condition. Then, the sequence $\{f_n\}$ consisting of the 12 elements is mapped to 12 subcarriers, to generate a first signal, and the first signal is sent. By using the determined sequence, when the signal is sent by using the PUCCH, a low correlation between sequences can be maintained, and a relatively small PAPR value and a relatively small CM value can be maintained. Therefore, a requirement of a communication application environment in which the signal is sent by using the PUCCH is met.

DESCRIPTION OF EMBODIMENTS

Figure 1:
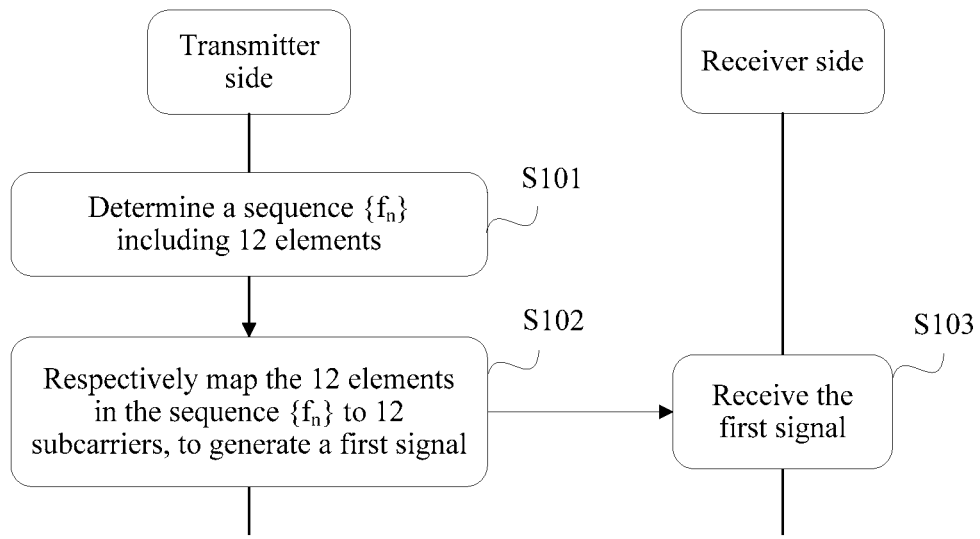
FIG. 1 is a schematic flowchart of a sequence-based signal sending processing method according to an embodiment of this application.

Embodiments of this application provide a sequence-based signal processing method and apparatus. A sequence meeting a requirement for sending a signal by using a PUCCH is determined. In this way, when the signal is sent by using the PUCCH, a low correlation between sequences can be maintained, and a relatively small PAPR value and a relatively small CM value can be maintained. Therefore, a requirement of a communication application environment in which the signal is sent by using the PUCCH is met.

In the embodiments, the claims, and the accompanying drawings of this application, terms "first", "second", and the like are intended to distinguish between different objects, but do not represent a particular order. In addition, the terms "include" and "with" are not exclusive. For example, the process, method, system, product, or apparatus that includes a series of steps or units is not limited to the listed steps or units, but may further include a step or a unit that is not listed.

Currently, in an LTE system, a 4G system, a 4.5G system, and a 5G system, sending UCI and a DMRS by using a PUCCH can be supported. To improve coverage performance of the PUCCH, the PUCCH is sent in a sequence modulation manner. To be specific, on all OFDM symbols for transmitting UCI, a to-be-sent signal is modulated onto a computer generated sequence (CGS). CGSs are screened to ensure that all sent signals have relatively small PAPR values and CM values, thereby expanding PUCCH coverage. Because the PUCCH is also used on a cell border, for a user on the cell border, a sequence correlation between sequences needs to be further considered during CGS screening.

For example, a first cell and a second cell are neighboring cells. If a first sequence used by the first cell is highly correlated with a second sequence used by the second cell, at a boundary of the first cell, a PUCCH sent by user equipment in the first cell may interfere with receiving a signal by a base station of the second cell by using a PUCCH. Consequently, PUCCH receiving performance is degraded. Therefore, sequences with a low correlation need to be determined during CGS screening.

To ensure that a relatively small PAPR value and a relatively small CM value can be maintained and a low correlation between sequences can be maintained when UCI and a DMRS are sent by using the PUCCH in the LTE system, the 4G system, the 4.5G system, and the 5G system, or even another communications system or communication application environment that has a higher requirement, the embodiments of this application provide a specific process of implementing sequence-based signal processing, and detailed description is provided by using the following embodiments.

In the embodiments of this application, sequence-based signal processing is mainly described from the perspective of a receiver side and a transmitter side in a communications system or a communication application environment. The receiver side may be a network device, and the transmitter side may be a terminal; or the receiver side may be a terminal, and the transmitter side may be a network device.

In the following embodiments, description is provided by using an example in which the receiver side is a network device and the transmitter side is a terminal, but this application is not limited thereto.

The terminal related to the embodiments of this application may be user equipment. The user equipment may be a wired device or may be a wireless device. The wireless device may be a handheld device with a wireless connection function, another processing device connected to a wireless modem, or a mobile terminal that communicates with one or more core networks by using a radio access network. For example, the wireless terminal may be a mobile telephone, a mobile phone, a computer, a tablet computer, a personal digital assistant (PDA), a mobile internet device (MID), a wearable device, an electronic reader, or the like. For another example, alternatively, the wireless terminal may be a portable, pocket-sized, handheld, computer built-in, or in-vehicle mobile device. For still another example, the wireless terminal may be a mobile station or an access point.

The network device related to the embodiments of this application may be a base station. The base station may include a macro base station, a micro base station, a relay site, an access point, a base station controller, a sending point, a receiving point, or the like in various forms. In systems using different radio access technologies, specific names of the base station may be different.

As shown in FIG. 1, FIG. 1 is a schematic flowchart of a sequence-based signal processing method according to an embodiment of this application. The method includes:

S101. A terminal determines a sequence $\{f_n\}$ consisting of 12 elements.

For execution of S101, optionally, the terminal may determine the sequence $\{f_n\}$ consisting of the 12 elements after accessing a network. Alternatively, when the terminal accesses a network, a network device determines a sequence $\{x_n\}$ and configures the sequence $\{x_n\}$ for the terminal, and the terminal determines the sequence $\{f_n\}$ consisting of the 12 elements based on the sequence $\{x_n\}$.

During specific implementation, $f_n$ represents an element in the sequence $\{f_n\}$, and the determined sequence $\{f_n\}$ is a sequence meeting a preset condition. The preset condition is $f_n = A \cdot x_n \cdot \exp(2\pi \cdot j \cdot a \cdot n)$; where n is an integer, a value of n is 0, 1, 2, 3, 4, 5, 6, 7, 8, 9, 10, 11, A is a non-zero complex number, a is a real number, $j=\sqrt{-1}$, $\exp(2\pi \cdot j \cdot a \cdot n)$ represents $e^{2\pi \cdot j \cdot a \cdot n}$, an element $x_n = u \cdot \exp(\pi \cdot j \cdot s_n/4)$, and u is a non-zero complex number; and a sequence $\{s_n\}$ consisting of elements $s_n$ is a sequence in a first sequence set or an equivalent sequence of a sequence in a first sequence set, or a sequence in a second sequence set or an equivalent sequence of a sequence in a second sequence set.

Optionally, sequences in the first sequence set include:
{−3, 1, 3, −1, 3, 1, −1, −1, −1, −1, 1, 1}, {3, 1, 3, 1, 3, 1, 3, −3, −1, −3, 3, 1}, {3, −1, 3, −1, −1, −1, −1, 3, 3, −1, −1, 3}, {1, 1, −1, −1, 3, 3, −3, −3, −1, 3, −1, 3}, {−1, −3, −3, 3, −3, 3, −1, −3, 1, 3, −3, −1}, {1, 3, 1, −1, 1, −1, −3, −1, 1, −1, 1, 3}, {−3, 3, 3, 1, −1, −3, 1, −3, −1, 1, 1, 3}, {−1, 1, 3, −3, −3, 3, 3, 1, 3, 1, −3, 3}, {3, 1, 1, −1, −3, 1, −3, −1, 1, 3, 3, −3}, {−1, −3, 3, 1, 1, 3, 3, −3, 3, −3, 1, 3}, and {−1, −1, −3, −3, −3, −3, −1, 1, −3, 1, −1, 3}; and sequences in the second sequence set include:
{−1, −3, 3, −1, 3, 1, 1, 1, −3, −1, 1, 1}, {3, 1, −3, 1, 3, 1, −1, −1, 1, 3, 3, 3}, {−1, 3, 1, 3, 1, −1, −1, −1, 1, −3, −1, 1}, {1, 3, 3, −3, 1, 3, 1, 3, 3, 1, −1, −3}, {−3, 3, 3, 1, −1, 3, −1, 3, −3, −3, −3, −1}, {−1, 3, −1, −1, −1, 3, −1, −1, −1, −1}, {3, 1, 3, −1, −3, 3, −1, −1, 3, −3, −3, −3}, {1, −3, 1, 1, −3, −3, −3, 1, −3, −3, −3}, {−3, 3, 3, 3, −1, −1, 1, 1, −3, 1, 3, −1}, {3, 3, 3, 1, −3, −3, 1, 3, −3, 1, −1, 1}, {1, −3, −1, 3, −1, −3, 3, 1, 1, 3, −3, −3}, {1, 3, −3, −1, −3, 3, 1, −1, −3, −1, −3, −1}, {−1, −3, 3, −1, −3, −3, −3, −1, 1, −1, 1, −3}, {−1, 1, 3, −3, 1, −1, 1, −1, −1, −3, 1, −1}, {1, −3, 1, −1, −3, 1, 3, −3, 3, 3, 3, −3}, {−1, 1, 3, −3, 3, 1, −1, −3, −1, −3, −1, −3}, {3, −1, −3, 3, 3, −1, 3, −3, −3, −3, −1, 1}, {−1, 3, −3, −1, 3, 1, −1, −3, −3, −3, −1, −1}, {−1, −1, 3, 3, 3, 3, 3, −1, 3, −1}, {−3, 1, 1, −1, 3, −1, −3, −1, −3, −3, −1, 1}, {3, −1, −3, 3, −1, 1, 3, −3, −3, −3, 3, 3}, {−1, 3, 3, −1, −1, 3, −1, 3, −1, −1, −1, −1}, {3, −1, −1, 3, 3, 3, 3, 3, −1, 3, −1}, {−1, 1, 3, −3, −1, −3, 3, 1, −1, −3, −1, −3}, {−3, 1, 3, 1, 3, −3, −3}, {−3, 3, −1, −3, 3}, {−1, 3, −1, −3, 1, 3, −3, −3, −3, 1, 1, −1}, {3, 1, 1, −1, 3, 1, 3, 1, 1, 3, −3, −1}, {−1, −3, 1, −1, −3, −1, 3, −3, 3, −3, −1, −1}, {1, 1, 1, 3, −1, −1, 3, 1, −1, 3, −3, 3}, and {−3, 1, −3, 1, 3, 3, −1, −1, −3, −3, −1, −1}.

An equivalent sequence of a sequence in the foregoing related sequence sets may be expressed as $\{q_n\}$. An element $g_n$ in the equivalent sequence $\{q_n\}$ meets $q_n = s_n + u_n (\bmod 8)$.

In a specific implementation, optionally, sequences $\{u_n\}$ consisting of $u_n$ include:

{1, 1, 1, 1, 1, 1, 1, 1, 1, 1, 1, 1}, {1, 3, 5, 7, 1, 3, 5, 7, 1, 3, 5, 7}, {1, 7, 5, 3, 1, 7, 5, 3, 1, 7, 5, 3}, {1, 5, 1, 5, 1, 5, 1, 5, 1, 5, 1, 5}, {3, 1, 7, 5, 3, 1, 7, 5, 3, 1, 7, 5}, {3, 3, 3, 3, 3, 3, 3, 3, 3, 3, 3, 3}, {3, 5, 7, 1, 3, 5, 7, 1, 3, 5, 7, 1}, {3, 7, 3, 7, 3, 7, 3, 7, 3, 7, 3, 7}, {5, 1, 5, 1, 5, 1, 5, 1, 5, 1, 5, 1}, {5, 3, 1, 7, 5, 3, 1, 7, 5, 3, 1, 7}, {5, 5, 5, 5, 5, 5, 5, 5, 5, 5, 5, 5}, {5, 7, 1, 3, 5, 7, 1, 3, 5, 7, 1, 3}, {7, 1, 3, 5, 7, 1, 3, 5, 7, 1, 3, 5}, {7, 3, 7, 3, 7, 3, 7, 3, 7, 3, 7, 3}, {7, 5, 3, 1, 7, 5, 3, 1, 7, 5, 3, 1}, and {7, 7, 7, 7, 7, 7, 7, 7, 7, 7, 7, 7}.

In an example of obtaining an equivalent sequence of a sequence {−3, 1, 3, −1, 3, 1, −1, −1, −1, −1, 1, 1} in the first sequence set, if a selected sequence $\{u_n\}$ is a sequence {1, 3, 5, 7, 1, 3, 5, 7, 1, 3, 5, 7}, an element $q_0$ in the equivalent sequence of the sequence {−3, 1, 3, −1, 3, 1, −1, −1, −1, −1, 1, 1} meets $q_0 = s_0 + u_0 \pmod 8$. It can be learned from the foregoing values that $s_0 = -3$, and $u_0 = 1$. In this case, a sum of $s_0$ and $u_0$ is first calculated, and then a modulo operation is performed on the obtained sum using 8. An obtained remainder is the element $q_0$. That is, the element $q_0$ is 0. By analogy, the following elements may be obtained: an element $q_1 = 0$, an element $q_2 = 0$, an element $q_3 = 6$, an element $q_4 = 0$, an element $q_5 = 0$, an element $q_6 = 6$, an element $q_7 = 6$, an element $q_8 = 0$, an element $q_9 = 0$, an element $q_{10} = 6$, and an element $q_{11} = 0$. Finally, the equivalent sequence {0, 0, 0, 6, 0, 0, 0, 6, 0, 0, 6, 0} of the sequence {−3, 1, 3, −1, 3, 1, −1, −1, −1, −1, 1, 1} is obtained.

Equivalent sequences of the foregoing other sequences of the first sequence set and the second sequence set are also obtained in the foregoing manner by referring to the foregoing manner. Details are not described herein again.

It should be noted that a value of a correlation between a cyclic shift of a sequence and a cyclic shift of an equivalent sequence of the sequence is relatively high. If a sequence and an equivalent sequence of the sequence exist in a same sequence set, two neighboring cells may be respectively use the sequence and the equivalent sequence of the sequence. This causes relatively strong interference when PUCCHs are sent in the two cells. Therefore, one sequence set can include either the sequence or the equivalent sequence of the sequence.

Figure 2:
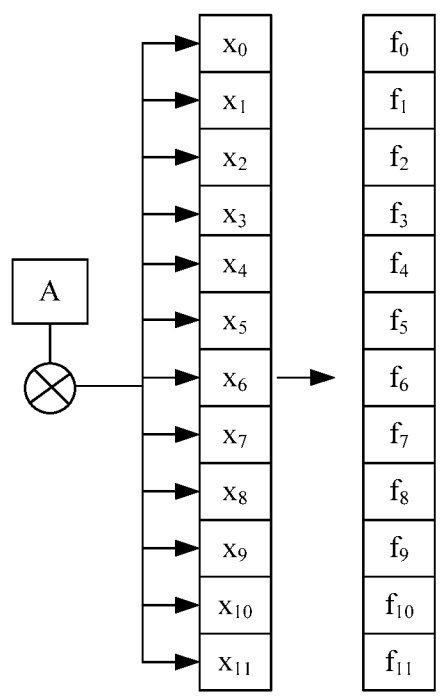
FIG. 2 is a schematic flowchart of determining a sequence $\{f_n\}$ by a terminal according to an embodiment of this application.

In a possible example, a process in which the terminal determines the sequence $\{f_n\}$ consisting of the 12 elements after accessing a network may be shown in FIG. 2. A specific procedure is as follows:

The terminal determines a sequence $\{x_n\}$ and A. A value of n is 0, 1, 2, 3, 4, 5, 6, 7, 8, 9, 10, 11, and A is a non-zero complex number. The sequence $\{x_n\}$ may be stored in the terminal, or may be configured by the network device for the terminal, or may be obtained by the terminal through calculation based on a predefined formula. For example, the sequence $\{x_n\}$ is obtained by using the element $x_n = u \cdot \exp(\pi \cdot j \cdot s_n / 4)$ in the foregoing disclosed $\{x_n\}$. The sequence $\{f_n\} = \{Ax_0, Ax_1, Ax_2, Ax_3, Ax_4, Ax_5, Ax_6, Ax_7, Ax_8, Ax_9, Ax_{10}, Ax_{11}\}$ is obtained by separately multiplying A by $x_0, x_1, x_2, x_3, x_4, x_5, x_6, x_7, x_8, x_9, x_{10},$ and $x_{11}$. A value range of A is $\{1, -1, j, -j\}$.

S102. The terminal maps the sequence $\{f_n\}$ consisting of the 12 elements to 12 subcarriers, to generate a first signal, and sends the first signal to a network device.

The execution of S102 herein mainly means that the terminal respectively maps the 12 elements in the configured sequence $\{f_n\}$ to the 12 subcarriers, to generate the first signal, and sends the first signal to the network device.

Figure 3:
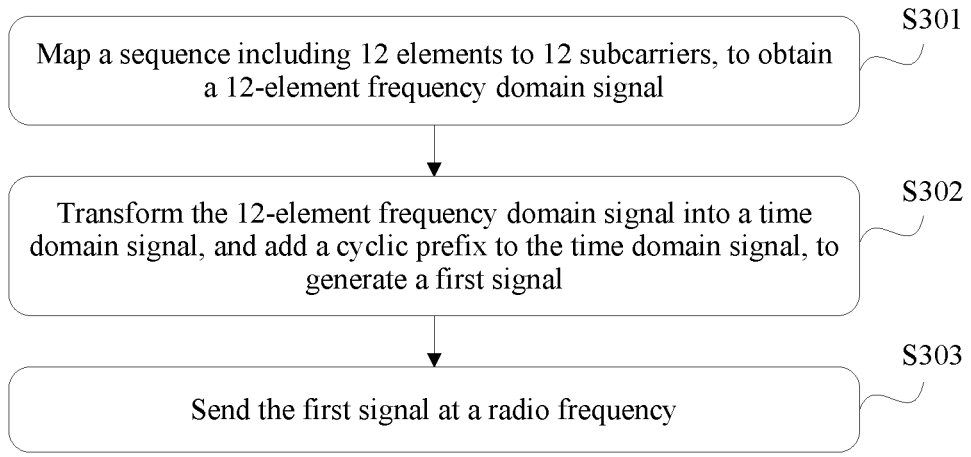
FIG. 3 is a schematic flowchart of generating and sending a first signal by a terminal according to an embodiment of this application.

Optionally, a specific process in which a terminal maps the sequence $\{f_n\}$ consisting of the 12 elements to the 12 subcarriers, to generate the first signal, and sends the first signal to the network device is shown in FIG. 3, including:

S301. The terminal maps the sequence $\{f_n\}$ consisting of the 12 elements to the 12 subcarriers, to obtain a 12-element frequency domain signal (that is, a frequency domain signal consisting of 12 elements).

In FIG. 4a to FIG. 4d disclosed in the following embodiments of this application, s represents a subcarrier index that is in a communications system and that is of a first subcarrier in the 12 subcarriers to which the sequence $\{f_n\}$ is mapped.

Figure 4A:
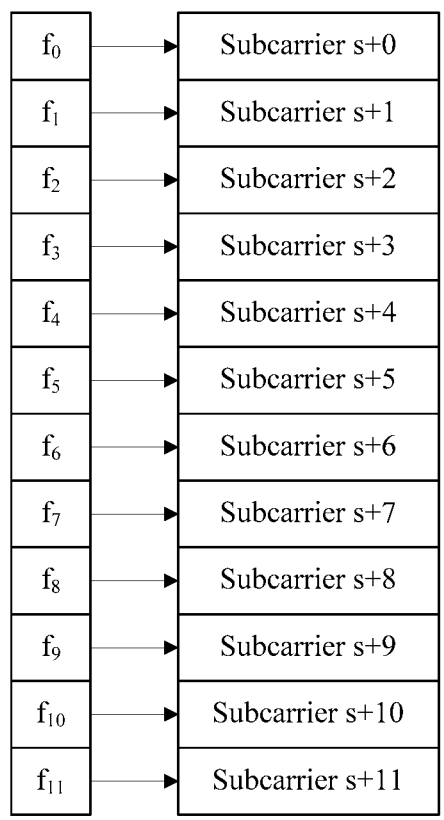
FIG. 4a to FIG. 4d are schematic diagrams of mapping a sequence $\{f_n\}$ consisting of 12 elements to 12 subcarriers according to an embodiment of this application.

Optionally, the terminal maps the sequence $\{f_n\}$ consisting of the 12 elements to 12 consecutive subcarriers. As shown in FIG. 4a, optionally, the elements $f_0$ to $f_{11}$ in the sequence $\{f_n\}$ are respectively mapped to 12 consecutive subcarriers s+0, s+1, s+2, s+3, s+4, s+5, s+6, s+7, s+8, s+9, s+10, and s+11.

In a possible example, the terminal successively maps the 12 elements in the sequence $\{f_n\}$ to the 12 subcarriers in descending order. One element in the sequence $\{f_n\}$ is mapped to one frequency domain subcarrier. The frequency domain subcarrier is a smallest unit of frequency domain resources, and is used to carry data information.

In a possible example, the terminal successively maps the 12 elements in the sequence $\{f_n\}$ to the 12 subcarriers in ascending order. Mapping one element in the sequence $\{f_n\}$ to one subcarrier means that the element is carried on the subcarrier. After the mapping, when the terminal sends data by using a radio frequency, it is equivalent to that the element is sent on the subcarrier. In a communications system, different terminals may occupy different subcarriers to send data. Positions of the 12 subcarriers in a plurality of subcarriers existing in the communications system may be configured by the network device through signaling or may be predefined.

Figure 4B:
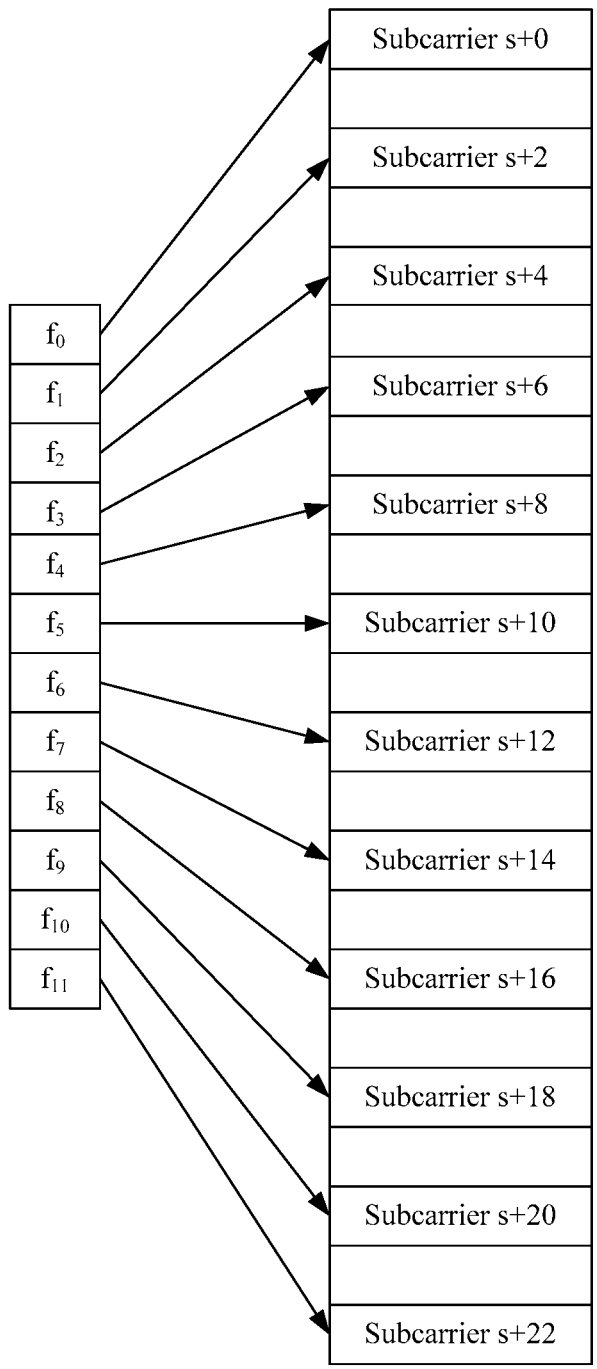

Optionally, the 12 elements in the sequence $\{f_n\}$ may be respectively mapped to 12 non-consecutive and equally spaced subcarriers. As shown in FIG. 4b, optionally, the 12 subcarriers are distributed at an equal spacing in frequency domain, and a spacing between any two of the 12 subcarriers includes one subcarrier. A spacing of subcarriers to which the elements $f_0$ to $f_{11}$ in the sequence $\{f_n\}$ are mapped is one subcarrier. Specifically, the elements are respectively mapped to 12 equally spaced subcarriers: s+0, s+2, s+4, s+6, s+8, s+10, s+12, s+14, s+16, s+18, s+20, and s+22.

Optionally, the 12 elements in the sequence $\{f_n\}$ may also be respectively mapped to a first subcarrier group and a second subcarrier group. The first subcarrier group and the second subcarrier group each include six consecutive subcarriers, and a spacing between the first subcarrier group and the second subcarrier group includes at least one or five subcarriers.

Figure 4C:
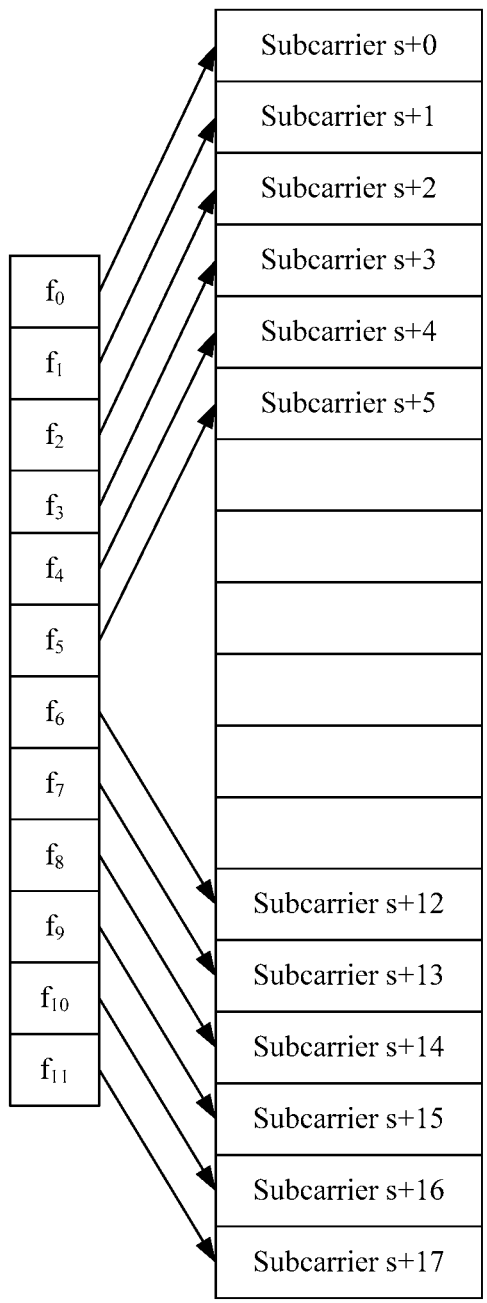

As shown in FIG. 4c, optionally, elements $f_0$ to $f_5$ in the sequence $\{f_n\}$ are mapped to six consecutive subcarriers: s+0, s+1, s+2, s+3, s+4, and s+5 (subcarriers in the first subcarrier group), and elements $f_6$ to $f_{11}$ are mapped to other six consecutive subcarriers s+12, s+13, s+14, s+15, s+16, and s+17 (subcarriers in the second subcarrier group). In addition, a spacing between the first subcarrier group and the second subcarrier group includes at least one subcarrier. In FIG. 4c, if the element $f_5$ is mapped to a subcarrier whose index is s+5, the element $f_6$ cannot be mapped to a subcarrier whose index is s+6. In other words, the first subcarrier group and the second subcarrier group cannot be adjacent to each other, and there is at least one subcarrier, between the first subcarrier group and the second subcarrier group, that belongs to neither the first subcarrier group nor the second subcarrier group. Optionally, when the first subcarrier group and the second subcarrier group each include six subcarriers, if a spacing between the first subcarrier group and the second subcarrier group includes at least five subcarriers, a smaller PAPR and CM can be obtained, and a better frequency diversity effect is obtained.

Figure 4D:
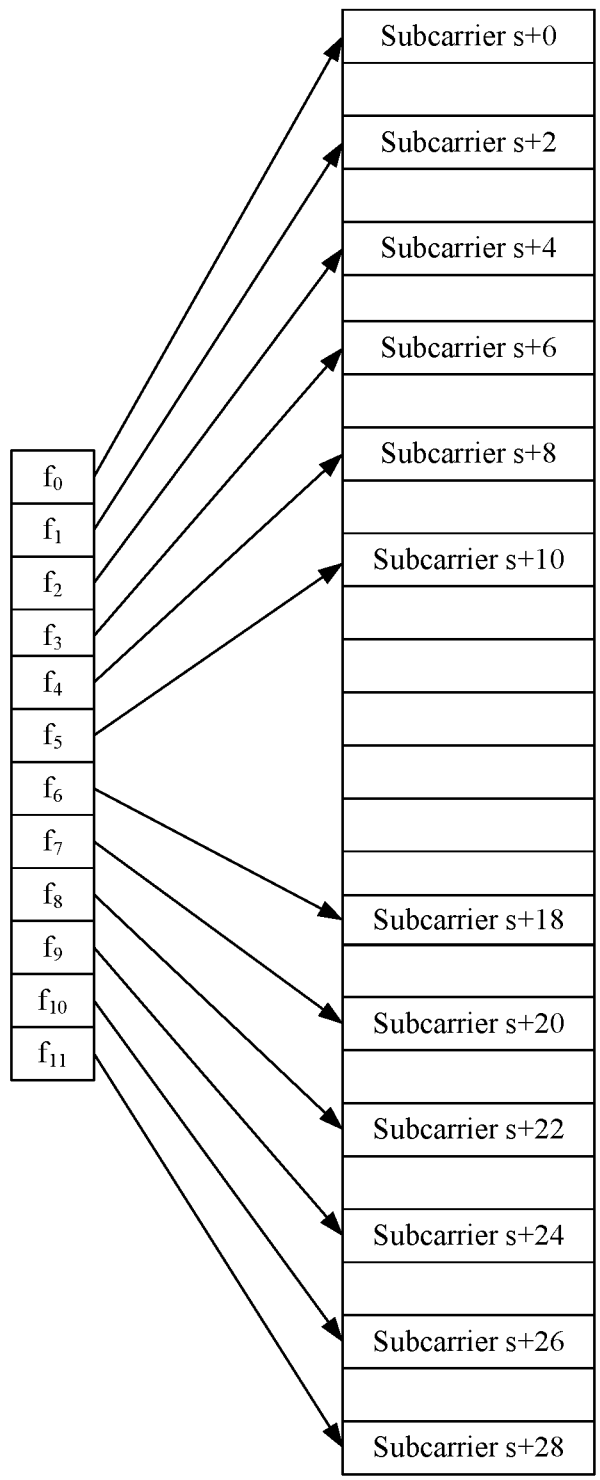

Optionally, the 12 elements in the sequence $\{f_n\}$ may also be respectively mapped to a third subcarrier group and a fourth subcarrier group. The third subcarrier group and the fourth subcarrier group each include six non-consecutive and equally spaced subcarriers, and a spacing between the third subcarrier group and the fourth subcarrier group includes at least one or five subcarriers. As shown in FIG. 4d, optionally, elements $f_0$ to $f_5$ in the sequence $\{f_n\}$ are mapped to six non-consecutive and equally spaced subcarriers s+0, s+2, s+4, s+6, s+8, and s+10 in the third subcarrier group, and elements $f_6$ to $f_{11}$ are mapped to six equally spaced subcarriers s+18, s+20, s+22, s+24, s+26, and s+28 in the fourth subcarrier group. Optionally, when the third subcarrier group and the fourth subcarrier group each include six subcarriers, if a spacing between the third subcarrier group and the fourth subcarrier group includes at least five subcarriers, a smaller PAPR and CM can be obtained, and a better frequency diversity effect is obtained. A quantity of subcarriers in a spacing between two subcarrier groups is a quantity of subcarriers between two subcarriers that are in the two subcarrier groups respectively and that are spaced by a smallest quantity of subcarriers. As shown in FIG. 4d, a spacing between the third subcarrier group and the fourth subcarrier group includes six subcarriers.

In the manner shown in FIG. 4a or FIG. 4b in which the sequence $\{f_n\}$ is mapped to consecutive or equally spaced subcarriers, CM values are relatively good. In the manner shown in FIG. 4c and FIG. 4d in which the sequence $\{f_n\}$ is mapped to two subcarrier groups, CM values are higher than those obtained in the manner shown in FIG. 4a or FIG. 4b in which the sequence $\{f_n\}$ is mapped to consecutive or equally spaced subcarriers, but a frequency diversity effect is better.

A manner of respectively mapping the 12 elements in the sequence $\{f_n\}$ to 12 subcarriers in this embodiment of this application is not limited to the foregoing manners.

S302. Transform the 12-element frequency domain signal into a time domain signal through inverse fast Fourier transformation (IFFT), and add a cyclic prefix to the time domain signal, to generate a first signal.

S303. Send the first signal at a radio frequency.

Optionally, when S302 is performed, the time domain signal obtained after the terminal performs IFFT on the 12-element frequency domain signal is an OFDM symbol. When S303 is performed, the terminal sends the first signal at the radio frequency. In other words, the terminal sends, on the 12 subcarriers, the first signal carrying the sequence $\{f_n\}$.

In a possible example, the terminal may send, on one OFDM symbol, the first signal carrying the sequence $\{f_n\}$, or may send, on a plurality of OFDM symbols, the first signal carrying the sequence $\{f_n\}$.

Optionally, the first signal is a reference signal. Specifically, the first signal may be UCI and a DMRS, or may be acknowledgment (ACK) information, or negative acknowledgment (NACK) information, or uplink scheduling request (SR) information. This embodiment of this application does not limit the first signal to including only the foregoing information.

Optionally, the first signal is a signal used to carry communication information. In a specific implementation, the communication information may be carried through sequence selection or may be carried in a sequence modulation manner, but is not limited thereto.

Optionally, in the sequence selection manner, $2^n$ orthogonal sequences are allocated for one terminal. Optionally, the $2^n$ orthogonal sequences may be $2^n$ cyclic shifts of one root sequence, and the $2^n$ orthogonal sequences can carry n-bit information. For example, there are four sequences $\{0\}$, $\{1\}$, $\{2\}$, and $\{3\}$, where 00 is corresponding to the sequence $\{0\}$, 01 is corresponding to the sequence $\{1\}$, 10 is corresponding to the sequence $\{2\}$, and 11 is corresponding to the sequence $\{3\}$. In this case, the four sequences can carry 2-bit information.

It should be noted that for the sequence selection manner, different cyclic shifts are represented by using different values of a in the sequence $\{1\}$. Optionally, a may carry different pieces of information.

Optionally, in the sequence modulation manner, one sequence is allocated for one user, and a modulation symbol is generated for information that needs to be transmitted by the user. The modulation symbol includes but is not limited to a BPSK symbol, a QPSK symbol, an 8 QAM symbol, a 16 QAM symbol, or the like. The modulation symbol is multiplied by the sequence to generate an actually to-be-sent sequence. For example, one BPSK symbol may be 1 or −1. For a sequence $\{s\}$, after modulation is performed based on the BPSK symbol, a to-be-sent sequence may be $\{s\}$ or $\{-s\}$.

In a possible example, according to description corresponding to FIG. 2 in the specification, after accessing a network, the terminal may determine, based on A and a sequence $\{x_n\}$, a sequence $\{f_n\}$ that consists of 12 elements and that is configured by the network device.

It should be noted that for the sequence modulation manner, different pieces of information are carried by using different values of A in the sequence $\{f_n\}$.

Optionally, A may be a modulation symbol. In this case, A is obtained after a data information bit or control information bit is modulated. A is carried on the 12 elements included in the sequence $\{f_n\}$.

Optionally, A is a constant. For example, A=1. That A is a constant means that A does not carry an information bit. For example, A may be a symbol known to both the terminal and the network device. Alternatively, A may represent an amplitude.

It should be noted that although A is a constant, it does not represent that A is constantly unchanged. When the first signal is sent at different moments, A may be variable. For example, all the 12 elements included in the sequence {f$_n$} or the sequence {x$_n$} are a reference signal, and A is an amplitude of the reference signal. When the terminal sends a first signal for a first time, the first signal may be sent based on A=1. When the terminal sends a first signal for a second time, the first signal may be sent based on A=2.

S103. The network device receives the first signal carried on the 12 subcarriers, to obtain the 12 elements in the sequence {f$_n$}.

It can be learned from S102 that the first signal is generated by respectively mapping the 12 elements to the 12 subcarriers based on the sequence {f$_n$} consisting of the 12 elements. For detailed description of the sequence {f$_n$}, refer to corresponding description in S101 and S102. Details are not described herein again.

For execution of S103, optionally, a process in which the network device receives the first signal carried on the 12 subcarriers is: the network device obtains a time domain signal and removes a cyclic prefix from the signal, and then performs 12-element FFT on a signal whose cyclic prefix is removed, to obtain a 12-element frequency domain signal; then, the terminal receives the first signal carried on the 12 subcarriers. The first signal is the sequence {f$_n$} consisting of the 12 elements. For example, the network device receives the signal on the 12 subcarriers based on positions of the 12 subcarriers in subcarriers in a communications system that are configured by the network device or predefined.

In a specific implementation, after accessing a network, the terminal sends a PUCCH by using a configured sequence {f$_n$}, and the network device receives the PUCCH by using the sequence {f$_n$} configured for the terminal.

S104. The network device processes the first signal based on the 12 elements in the sequence {f$_n$}.

Figure 5:
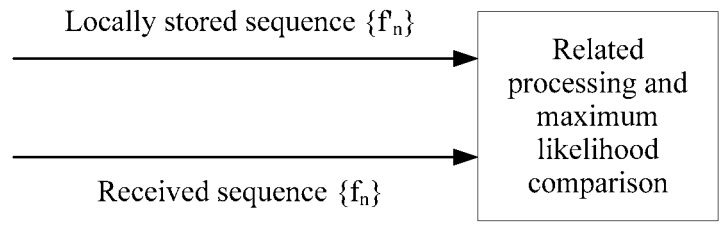
FIG. 5 is a schematic diagram of processing a first signal by a network device according to an embodiment of this application.

Optionally, FIG. 5 shows a schematic diagram of a process in which the network device processes the first signal. The network device obtains all possible sequences by traversing a locally stored sequence {f'$_n$}, separately performs correlation processing and maximum likelihood comparison on the obtained sequence {f$_n$} and all the possible sequences of the sequence {f'$_n$}, to obtain data transmitted by the terminal.

With reference to the description corresponding to the foregoing S102 in the specification, a value combination for 2-bit information is {(−1, −1), (−1, 1), (1, −1), (1, 1)}. With reference to FIG. 2, when the 2-bit information is (−1, −1), the obtained sequence {f$_n$} is a sequence {f'$_{1,n}$}; when the 2-bit information is (−1, 1), the obtained sequence {f$_n$} is a sequence {f'$_{2,n}$}; when the 2-bit information is (1, −1), the obtained sequence {f$_n$} is a sequence {f'$_{3,n}$}; when the 2-bit information is (1, 1), the obtained sequence {f$_n$} is a sequence {f'$_{4,n}$}. The sequence {f$_n$} is separately correlated with {f'$_{1,n}$}, {f'$_{2,n}$}, {f'$_{3,n}$}, and {f'$_{4,n}$}, to obtain four correlation values. A value of 2-bit information corresponding to a largest correlation value is the data obtained by the network device. For example, if the largest correlation value is obtained through correlation between the sequences {f$_n$} and {f'$_{1,n}$}, the 2-bit information is (−1, −1).

According to the sequence-based signal processing method disclosed in this embodiment of this application, a sequence meeting a requirement for sending a signal by using a PUCCH is determined. The sequence is a sequence {f$_n$} consisting of 12 elements, f$_n$ represents an element in the sequence {f$_n$}, and the determined sequence {f$_n$} is a sequence meeting a preset condition. The preset condition is f$_n$=A·x$_n$·exp(2π·j·a·n), a value of n is 0, 1, 2, 3, 4, 5, 6, 7, 8, 9, 10, 11, A is a non-zero complex number, a is a real number, j=$\sqrt{-1}$, exp (2π·j·a·n) represents $e^{2\pi \cdot j \cdot a \cdot n}$, an element x$_n$=u·exp(π·j·s$_n$/4), and u is a non-zero complex number. A sequence {s$_n$} consisting of elements s$_n$ is a sequence in a first sequence set or an equivalent sequence of a sequence in a first sequence set, or a sequence in a second sequence set or an equivalent sequence of a sequence in a second sequence set. Then, the 12 elements in the sequence {f$_n$} are respectively mapped to 12 subcarriers, to generate a first signal, and the first signal is sent. By using the determined sequence, when the signal is sent by using the PUCCH, a low correlation between sequences can be maintained, and a relatively small PAPR value and a relatively small CM value can be maintained. Therefore, a requirement of a communication application environment in which the signal is sent by using the PUCCH is met.

Further, based on the lowly correlated sequence-based signal processing method disclosed in this embodiment of this application, for the sequence {s$_n$} related to the sequence {f$_n$} that consists of the 12 elements and that is determined in S101, the sequence {s$_n$} consisting of elements s$_n$ may be a sequence in a third sequence set or an equivalent sequence of a sequence in a third sequence set. Sequences in the third sequence set include:

{−3, −3, −3, −3, 3, −1, 1, −3, 3, 1, −3, −1}, {1, 1, 1, −1, −1, 3, −1, −1, 1, 3, 1, −3}, {1, 1, 3, 1, −1, 3, 3, 3, −1, 1, −3, 1}, {1, −1, −3, −3, 3, −3, −1, −3, 1, −3, −3, −1}, {1, 1, 3, −1, 3, −3, −3, −1, 3, 1, −1, −3}, {1, −3, −3, 3, −1, −1, 1, 3, 3, 1, 3, 1}, {−1, −3, −3, −3, 3, −1, 1, −3, 3, −1, 1, 3}, {1, 1, −3, 3, 3, −1, 1, 3, −1, −3, 1, −3}, {−3, −1, 3, −3, −3, −1, −3, 1, −1, −3, 3, 3}, {−3, 3, −3, 3, −1, 1, 3, −1, −1, −3, 1, 1}, {−1, −1, −3, 3, 1, −3, 3, −3, −1, 3, −3}, {1, −1, −1, −1, −1, 1, 1, −3, 3, −1, 1, −3}, {−3, 1, −3, −1, −1, 1, −3, −1, −1, −3, 3}, {3, 3, −1, −1, 1, −3, 1, 3, 1, 1, 3, 1}, {−3, 3, −1, 1, 3, −1, −3, 1, 3, 3, 3, 3}, {−1, 3, −3, 1, −1, 3, 3, −3, −3, −3, −3, 3}, {−3, −3, 3, −3, −1, 3, 3, 3, −1, −3, 1, −3}, {−3, −1, 1, 3, −1, −3, −3, 3, −1, 3, 1, 1}, {3, 3, 3, −3, 1, 3, 3, −3, 1, −1, −3, 1}, {1, −1, −3, 3, −3, −1, 1, −3, 3, −3, 3, −3}, {3, 1, −3, 3, 3, 1, 1, 3, −3, −1, −3, −1}, {−3, −1, −3, −1, −3, 3, −3, −1, 1, −1, −3, 3}, {−1, −1, −1, −3, 3, −1, −3, −1, 3, −1, 1, 3}, {3, −1, 1, −3, −1, −1, −3, 3, −3, −3, −1, −1}, {3, −3, 1, 3, −3, −3, 3, 1, −3, 3, 1}, {−3, −1, 1, 3, −1, −3, 3, 1, 1, −1, 1, −1}, {−1, 3, −3, −3, 1, −3, 1, 1, −1, 3, 1, 1}, {−3, 1, −1, −1, −1, 1, 1, −3, −1, −1, 3}, {−1, 3, −1, 1, −3, −3, −1, −1, 3, 1, 1, 1}, {3, 1, 1, 3, 1, −1, −3, −1, 3, 1, −3, −1}, {−3, −3, −1, 1, 1, −3, 3, −3, −3, −3, −1, 3, −1}, {3, −3, −3, −3, 3}, {3, −3, −1, 1, −1, −3, 3, −3, −1, −3, −1, −3}, {1, −1, −3, −1, −1, 1, 3, −3, 1, −3, −1, −3}, {−1, 3, 3, −1, −3, 1, −3, 1, 3, 3, 3, 3}, {3, 1, 3, −1, 3, −3, −1, 1, 1, 3, 1, −1}, {1, −3, 3, −1, 3, 3, 3, 1, 1, −1, 1, 3}, {−1, 3, −3, 1, −3, −3, −3, −1, −1, 1, −1, −3}, {−3, 3, 1, 3, −1, 1, 3, −3, −3, −3, −1, −3}, {1, −1, −1, −3, −3, −1, 3, −1, −1, 1, 1, 3}, {3, 1, 1, −3, 1, 3, −1, 1, 3, 1, 3}, {−1, −3, −1, −3, −1, −1, −3, 1, 1, 3, −3, −1}, {1, −1, −1, −3, −3, 1, −3, 3, 3, −3, −3, −1}, {1, 3, −3, 1, 3, 1, −3, 3, −3, −3, 3, 1}, {3, 3, 1, 1, −3, 1, −3, 1, −3, −3, −1, −1}, {3, −3, 3, 1, 1, 1, −3, 3, 1, 3, −3, 1}, {3, 3, 3, 1, −1, −1, 3, 1, −3, 1, 3, −3}, {−3, −3, −3, −3, 1, −3, 1, 3, −1, −1, 3, 3}, {1, 3, 1, −1, 3, −1, −1, −3, 3, −3, −1, −1}, {−1, 1, −1, 1, −1, −1, 1, −3, −3, 3, 1, −1}, {−1, −3, −1, −3, −1, 3, −3, −1, 1, −1, −3, 3}, {3, 1, 3, 1, −3, 3, 1, −1, −1, 1, 3, −3}, {−3, 1, 1, −1, 3, 3, 3, 1, 1, 3, −1}, {−1, 1, 3, −3, 1, 1, −1, 3, −3, 3, −3, 3}, {1, 3, −3, 3, 3, 1, 1, 1, −3, 1, −1, 3}, {−1, −1, −1, 1, 3, −1, 1, −1, 3, −1, −3, 3}, {−3, −3, 1, 1, −3, 3, 3, 3, 3, −1, 3, −1}, {−1, 1, 1, 3, −3, 1, −3, 3, 1, 1, −1, −3}, {3, −1, 3, 1, −1, 3, 3, 1, 1, 3, −3}, {3, −1, −3, 1, 1, 1, 1, −3, −1, 3}, {−3, −1, −1, −3, −3, −1, −3, 1, 3, −1, −3}, {3, −1, −3, −3, 3, −3, 3, 3, −3, −1, −3, 3}, {−1, 1, −1, 1, 3, −3, −3, 3, 1, −3, 3}, {1, 3, −3, −3, 3, 3, 1, −3, 3}, {−1, −3, 3, 1, −3, −1, 1, 3, 3, −3, 3, −3}, {−1, 3, 3, −1, 3, −1, −3, −3, 3, 3, −3}, {1, −3, 1,

−3, −3, −3, −3, −1, −1, 3, 3, −1}, {3, −3, 3, −3, 3, −1, 1, 3, −3, 3, 1, −1}, {−3, −1, 3, 1, −3, −1, −3, 3, 1, 3, 3, 1}, {1, −3, 1, −3, −3, −3, −3, 3, −1, −1, 3, 3}, {−1, −1, −3, 1, −3, −1, 3, −1, −1, 1, −3, −3}, {−1, −3, 3, −3, −3, −1, −1, −1, 3, −1, 1, −3}, {1, 3, −3, 1, 3, −3, −3, −3, 3, 1, −3, 3}, {−3, −3, 1, 3, −3, 1, −3, −3, −1, −3, 1, 1, 3, 3}, {−3, −3, −3, −1, 3, 3, 1, 1, −3, −1, 3}, {−1, −1, 3, 1, 1, −3, 1, −1, 3, −1, 1, 1}, {−1, 1, 1, 3, 3, −1, 3, −3, −3, 3, 3, 1}, {1, 1, −3, −3, 1, 3, −1, 3, −1, −1, −1, −1}, {−3, −3, −3, 3, 3, 3, −3, −1, 3, −1, −3, 1}, {1, −1, 3, −1, −1, −1, −3, −1, 1, 1, 1, −3}, {−3, 3, 1, −3, −1, −3, −3, 3, −3, −3, −1, 1}, {−1, 1, 1, −1, 1, −1, −3, −3, 1, 1, −1, 3}, {3, −1, −3, −1, 1, 3, −1, −3, −3, −3, 3}, {1, 1, −1, 1, −3, 1, −1, 3, 3, −1, −1, 1}, {3, −1, 3, 3, 3, −3, 1, 1, −1, 3, 3}, {3, −3, 3, 3, −3, −1, −3, 1, 3, −3, 3, 1}, {−1, −3, 3, −1, 1, −1, −3, −3, −1, −3, −1, 1}, {1, −3, 3, 1, −3, −3, −3, −3, −3, 1, 3}, {1, −1, −3, −3, 3, −3, −3, −3, −1, 1, 3, −1}, {1, −3, −1, −1, −3, −3, −3, 3, −1, −1, −3, 1}, {−3, −1, 3, −3, −3, −3, 1, −1, 3, 1, −1}, {−1, −1, −3, −3, 3, 1, 3, −3, 3, −3, −1}, {−1, −3, 1, −3, −1, 1, 1, 3, 3, 1, 1, −1}, {3, 3, 3, 3, −1, 1, −3, −3, 1, 1, −3, 3}, {1, 3, −1, −3, −1, −3, 1, −3, 1, −1, −1}, {3, 1, 1, 3, 3, −1, −1, 1, −3, 1, 3, 1}, {−1, 1, 1, 1, 3, 1, −1, −3, 1, 3, 1, −1}, {3, −3, −3, 1, 1, −3, 3, −1, 3, −3, 3, 3}, {3, −1, 1, −1, −3, 3, 1, −1, 1, 1, 1, 3}, {−3, −1, 3, 1, 3, 1, −1, 3, −1, −3, −3}, {−3, −1, −1, −1, −1, −3, 3, 1, −1, 3, −3, 1}, {3, −1, 3, 3, −1, 1, 1, 1, −1, 3, 1}, {−1, −1, −1, −1, 3, 1, −3, −3, 1, 1, −3, −1}, {1, 1, 3, 3, −3, 1, 3, −1, −1, 1, −3, 1}, {3, −3, −3, −1, 3, −1, 3, 3, 1, 1, −1, −3}, {3, −1, −1, −3, 1, −3, 3, −3, 3, 1, 3}, {3, 3, 1, −3, −3, 3, −1, 3, −1, −1, −1}, {3, −3, 3, 1, 3, 1, −3, −3, 1, −1, 3}, {−1, −3, −3, 3, −1, −3, −1, 3, −3, −1, 1, 1}, {−1, 3, −1, −3, 3, 1, 1, 1, −3, −1, −1, −1}, {−1, 3, −1, −1, −1, −1, −1, 3, 3, 3, −1}, {1, −1, −3, −3, −3, −1, −1, 1, −3, −1, 3, −1}, {3, −1, 3, −1, −3, −1, −1, −1, 3, 3, 3}, {−1, 3, 3, 3, −1, −1, 1, −1, 1, 1, −1, 1}, {−3, 3, −3, −1, −3, −1, 1, 3, −3, −1, −3, 3}, {−3, −1, −1, 1, −3, −1, −3, 1, −1, −3, 3, 3}, {1, −1, 1, −3, −3, 1, 3, −1, −1, −1, 1, −1}, {3, −1, −1, 1, 3, 3, 1, 3, 1, 1, −1, 3}, {−1, 1, −1, −1, −1, 3, 1, −3, −3, 1, −1, 1}, {3, −3, 1, −1, 1, −3, 3, 1, −3, 3, 3, −3}, {1, 1, 3, 3, −1, 1, −1, −3, 1, −3, −1, 3}, {1, 1, −3, −1, 1, −3, −3, 3, 1, −1, 3, −3}, {3, 3, 3, 1, 1, −3, 3, 1, −3, 1, −3, −1}, {1, −1, −1, 1, 3, 3, −3, 3, 3, 1, −1}, {−1, 1, −1, −1, 1, −1, 1, 1, −3, −3, −1}, {−1, −1, −3, −3, −3, −1, 1, −1, −1, 3, 1, −3}, {−1, −3, 1, 3, 1, 3, −1, 3, 3, −1, 1, 1}, {−3, −3, 1, 3, −3, 3, −1, −3, −1, −3, 1, 1}, {−1, 1, 3, 1, −3, 1, −1, 3, 1, 1, −1, −1}, {−1, −1, −1, 1, −3, −3, −3, 3, −1, −1, 3, −1}, {3, 3, 3, −3, −1, −3, −1, 3, 3, 1}, {−1, 1, 3, 1, 1, 1, −1, −1, −3, 1, −1, 3}, {−3, −1, 3, −3, −1, −1, −1, 1, 1, 1}, {−3, 3, −3, −1, 3, 1, −1, 3, 3, 3}, {1, 1, 1, −3, −3, −3, 1, −3, −3, 1, −1}, {3, 3, −3, 3, −3, −1, 1, 3, −1, −3, 3, 3}, {−3, −3, −1, −1, −3, 3, 1, 1, −3, 1}, {1, −3, 1, −1, 3, 1, 3, −3, −1, −1, −3, −3}, {−3, 1, −3, −1, 3, −3, −3, −1, −1, −1, −3, 3}, {1, −3, 3, −1, 3, −3, −1, −3, 1, 1, −1, −1}, {−1, −3, 3, −1, 3, −3, 1, 3, 3, −3, −3, −3}, {3, 1, 1, −3, −1, 1, 1, 3, 1, 3, 1, −3}, {3, 3, −3, −1, 1, −3, 1, 3, 1, −3, 3, 3}, {−1, −3, −1, −1, −3, 3, −3, 1, −1, −3, −1}, {−3, −3, −3, 3, 1, 3, −3, −1, 3, 1, −3}, {−3, 1, 3, −1, 1, 1, 3, 3, 3, 1, −1, 3}, {−1, 1, −3, −3, 1, 1, −3, 3, −1, −1, −1, −1}, {3, −3, 1, −1, 1, −3, 3, −3, 3, −3}, {−1, −3, 3, −3, 3, 1, 3, −3, 3, −3, −1, 1}, {−1, 1, −3, 1, −1, −3, 3, 3, −3, −3, −3, −1}, {1, 3, −3, −3, 1, −1, 3, 3, 3, 1, 3}, {1, −3, −1, −1, 1, 1, 1, −1, −3, −3, 1}, {−1, −1, 1, 3, −3, 1, 3, 1, −3, 3, 3, 1}, {3, 3, 3, −3, −3, −3, 1, 3, 3, −1, 1, −3}, {1, −3, −1, −1, 1, −1, 1, −3, −3, 1, 1}, {−1, −1, −1, 3, −3, −1, 3, −1, 3, −1, 1}, {3, 3, 3, −1, −3, −1, −1, −1}, {3, −3, 1, −3, 1, 1, 1, 1, −3, −3, 1, 3, 3}, {−3, 1, −3, −1, 1, −1, −3, −3, 3, −3, −3}, {−3, 3, −3, 3, 1, 1, −3, 1, −3, 3, 3, −3, −1}, {−3, −1, 3, −1, −1, −1, 3, −1, −3, 3, 3, 3}, {1,

1, −1, −3, −1, 1, −1, −3, 1, −3, −1, 1}, {1, −1, −3, 1, −3, −3, 3, −3, 1, −3, −3, −3}, {−3, 3, 1, 3, 1, 3, 3, 3, −3, −1, 1, −3}, {1, −3, −1, −3, 1, 1, 3, 1, 3, 3, 1, 1}, {−3, −1, −1, 1, −3, −3, 1, 3, 1, 1, −3, 3}, {−1, −1, 3, −3, −1, −3, −3, 3, −3, 3, −1, −1}, {1, −3, 1, 1, 3, 1, −3, −3, 1, −3, 3}, {3, 1, 1, −3, 1, −3, 3, 3, −1, 1, 1}, {−1, 3, 1, −3, −3, 3, −1, −1, −1, −3, −3, −3}, {1, −1, −3, 1, −3, 3, −1, −1, −1, 1, 1}, {1, 3, 1, −3, −3, 1, 3, −1, −1, −1, −3, −1}, {−3, −3, −3, −1, 1, −1, −3, 3, −1, −3, 3}, {−1, −1, −3, 3, 1, −3, −3, −1, −1, 1, −3, −1}, {−3, −3, 3, −1, −3, −1, 3, 1, 1, 3, −1, −1}, {3, −1, −3, 1, −3, −3, 3, 3, 3, 3, −3, −1}, {1, 1, −3, −1, −1, −3, 1, 3, 1, −3, 3, 3}, {−1, −1, 3, −3, −1, −3, −1, −1, 3, 1, 3, 1}, {1, −3, 3, 3, 3, 1, −1, 1, 1, −3, 3, 1}, {1, −3, 1, 3, 3, 1, 3, 3, −3, −3, 1, 1}, {−1, 3, −1, −1, −3, 3, 3, 3, −3, −3, −1}, {1, −3, 3, −1, −3, 3, 1, 1, −1, 1, 3}, {1, 3, 3, −3, 1, 3, −1, 3, 3, 3, 1, −1}, {−1, 1, 1, −3, 1, −1, 1, 3, 1, −1, −3, −3}, {−1, −1, −3, 1, −3, 3, 1, 3, −1, 1, 3, 3}, {−3, −1, 1, 1, 3, −3, 3, 3, −3, 3, 3, 1}, {1, 1, −3, −3, 3, −3, 1, 1, −3, 1, −1, 1, 1}, {1, −3, −1, −3, 3, 1, −1, −1, 1, −1, −1, 1}, {−3, −1, 3, −1, −3, 1, 1, 1, −1, −3, −3, −1}, {3, −3, −3, −3, −3, 1, −3, −3, 3, 1, 3, −1}, {3, −1, 1, 1, −3, −1, −1, −1, −1, −1, 3, 1}, {1, 3, −1, 3, −1, −3, 3, −1, −1, 3, 3, 3}, {3, 1, −3, 3, −3, −1, −3, −3, −3, 1, 3}, {1, −1, 3, −1, 3, −3, −1, 3, 3, −1, −1, −1}, {−1, −1, −3, −3, 3, 1, −3, 3, −1, −3, −1, 1}, {−3, 3, 3, 1, −3, 3, −1, 3, 3, −3, −1}, {−1, −1, −1, 3, 1, −3, 3, −1, 3, 3, −3, 1, 3}, {−3, −1, −1, 1, −3, 1, −1, −1, 1, −3}, {3, 1, 1, −3, −1, −1, −3, −1, 1, 1, 3}, {3, −1, 1, −3, −1, −1, −3, −1, 1, 1, 3}, {−3, 1, 1, −3, −1, −3, −3, −1, 1, 1, 1}, {−1, −1, 1, 1, −1, −1, 3, −3, −3, −1}, {1, −1, −3, −3, −3, −1}, {3, −3, 3, 3, 3, −1, −1, 1, −1, 3, 3, −1}, {3, 1, −1, 1, 3, 3, −1, −3, −1, 1, −3, 1}, {1, −3, −3, −1, 3, 1, 3, 1, 1, −1, −3}, {−1, −3, 1, −3, −1, 1, 3, 3, −3, −1, −1, −3}, {−3, −3, −1, −3, 3, 1, −3, −3, 1, 3, −1}, {−1, 3, 1, −3, −1, 3, −3, 3, 3, 3, −3}, {1, 3, 3, −3, 1, 3, −1, −1, −3, 1, −3}, {1, −3, 1, −1, −3, 3, 3, 1, −3, −3, −3, −1}, {−3, −3, 1, −1, 1, −1, −1, −3, −1, 1, −3, −3}, {−1, −1, 3, 3, −3, −1, −1, 3, −1, 1, −1}, {3, 3, 3, −3, −1, 3, −1, −1, −1, 3, −1, −3}, {1, −1, 3, 1, −1, −1, −3, −1, 1, 3, 3, 3}, {1, 3, 3, −3, 3, 3, −3, 3, 1, 1, −1, −3}, {3, −1, −3, 1, 1, −3, −1, 1, 3, 1, 1}, {3, −3, 1, −3, 1, −1, 1, 1, 3, 3, 1, 1}, {1, 1, −3, 3, 1, 3, 3, −3, 3, −1, 1}, {1, −1, −1, −1, −1, 1, 3, −1, −1, −3, 1}, {−3, 1, −3, 1, 1, 1, 3, −1, −1, 1, −3}, {3, 1, −3, 3, 3, 3, 1, −1, −1, 1, 3, −3}, {−1, 3, −3, 1, 3, 3, −3, −3, −3, 3}, {1, −1, 1, −3, −3, −1, 3, 3, −1, 3, 3}, {−3, −1, −3, 1, 3, −1, −3, 1, 3, 1, 1}, {3, −1, −3, −3, −3, −3, −3, 1, −1, 3, 1}, {−1, −1, −3, −1, 1, 3, −3, 3, 3, 3, 1, 1}, {1, 3, −3, −3, 3, 3, 1, −1, −3}, {1, −1, −1, −3, 1, −3, 1, −1, 1, 3}, {3, 3, 1, 1, 3, 3, −3, 1, −3, −3, 1}, {3, 3, −3, −1, 3, 3, −3, 1, −3, 1, 1, −1}, {3, 3, 3, −1, −3, −1, −1, 3, 1, −3}, {−1, −3, 3, −1, −1, −1, −3, −1, −3, −1, 1, 3}, {3, 1, 3, −1, −1, 3, 1, −1, 1, 1, 1, −3}, {−1, −3, −1, −1, −1, 3, 1, −1, −3, 3}, {1, −3, 1, −1, 1, 3, −1, −1, 3, 3, 3, 3}, {−3, −3, −3, −1, −3, 3, −1, 3, −3, −1}, {3, 1, −1, 1, −1, −3, −3, −3, −1, 1}, {3, 1, 3, −3, −3, 1, 3, −3, 3, 3, −1}, {1, −1, −1, −1, 1, −3, 1, 3, 1, −3, 3, 1}, {−1, 3, −1, −1, −3, 3, 1, 3, 3, 3}, {−1, 3, 3, −1, −3, −1, 3, 1, 1, 1, 1, −1}, {−1, −1, 3, −1, 3, −1, −3, 3, −1, −1, −1}, {−1, −1, 3, 3, 1, 3, 3, −1, 3, −1, 1}, {1, −3, 1, −3, 3, 3, 3, 3, −3, −1, 1}, {1, 1, −1, 1, 1, −3, −1, 1, −3, 3, −3}, {−3, −3, 1, 1, 3, 1, 1, 3, −1, 1, 3, 3}, {3, 1, 3, 1, −1, 3, −3, 1, 3, −3, −3, −1}, {1, −3, 3, 1, −1, −3, −3, −3, 1, 1, 1}, {−3, 1, 3, −1, −3, −3, −1, 1, 3, −1}, {1, 3, −1, −3, −3, −1, −1, 1, 3, −1, 1, 3, 3, −1, −1}, {1, −3, 1, −3, 1, 3, 3, 1, 3, 3, −1, −1}, {3, −1, −3, 3, 3, 1, 3, 1, −3, −1, −1}, {1, −3, 3, 1, −1, 3, 3, 3, 3, 1, 1, 3}, {−3, 1, 1, 3, −3, 3, 1, −3, −3, 3, 3}, {−1, −3, 1, −1, −1, −3, 1, 1, 1, −3, −1}, {−3, −1, 3, −1, −3, 1, 3, 3, 3, −1, −1, 1}, {1, 1, 3, −1, −3, 3, −3, 3, −3, −1, 1, −3}, {−1, 1, −3, −1, −1, −3, 1, 1, 3, −1, −3}, {1, −3, −1, 3, −3, −3, −3, −3, −1, −3, 1}, {−3, 1, −1, −3, −3, 3, 3, −1, 1, 1, 1, 3}, {−3, 3, −3, 3, 3, 3, 1, −1, 3, 3, 3, −3, −1}, {−3, −3, −3, −3, 1, 1, −3, −1, 1, −1, 3, −1}, {−1, −1, −1, 1, −1, 3, 3, −1, −1, 3, −3, 3}, {−3, −3, −1, 3, −3, −1, 3, 1, 1, −1, 3, 1}, {−3, 1, 1, 3, −1, 1, 1, 3, 1, −3, −3, 3}, {−1, 1, 1, 1, 1, −3, −1, 3, −1, 3, −3, −3, 1}, {−1, −1, 1, −1, −3, 3, −3, 1, −3, 3, −3, 1}, {3, −1, 3, −1, 1, 1, 1, 1, −1, −3, 3}, {1, 3, 1, 3, −3, 1, −1, 3, 1, −1, −1, −3}, {−3, 1, −3, −3, 1, −1, 1, 3, 3, 1, 1, 1}, {−1, −3, −3, 1, −3, 1, 3, 3, −1, 1, 3, 3}, {−1, −3, 1, −3, −1, −3, 1, 1, −1, 1, 3, −3}, {1, 1, −3, 1, 3, 1, 3, 1, 3, 3, −1, −1}, {3, −3, 1, 1, 3, 1, −3, 3, 3, 1, −3, −3}, {−3, 3, −3, 1, 1, −3, −3, 1, −1, 1, 1, 1}, {−3, 1, −1, 3, 1, 3, −3, −1, 1, −1, −1, −3}, {3, 1, −1, 3, −3, −3, 3, 3, −3, 3, −3, 1}, {−3, 3, 1, −1, 3, −1, 3, −1, 1, 1, 1, 1}, {3, −1, −3, 1, 3, −1, −3, −3, −3, 3, 3, −3}, {3, 1, −1, −3, −3, −3, −3, −3, −1, 3, −1, 3}, {−1, −3, 3, −3, 1, −3, −3, −3, −1, 1, 3, 1}, {−1, 3, −3, −1, −1, 3, 1, 3, 1, 3, 3, 1}, {−3, 3, −1, −1, −1, −1, 3, −3, −3, −1, 3, −3}, {1, 1, 3, 3, 1, 1, 3, 1, −1, −3, −1, 3}, {1, 3, −1, −3, 3, −1, 1, 1, −1, −1, −1, 1}, {−3, 3, −3, −1, 1, −3, 1, 1, 1, 3, 1, −1}, {1, −1, −3, 3, 3, −3, −1, −1, −1, 1, −3, −1}, {1, −1, −3, 3, 1, 3, −1, −1, 1, −1, 1}, {1, 3, 3, 3, 3, 1, 3, 1, −1, −3, −3, 1}, {3, −1, 3, 3, −1, 3, 3, 3, −1, −1, −1}, {−1, 3, 3, 1, −3, −3, −3, −3, 3, 1, 3}, {−1, −1, 1, −3, −3, 1, 1, −1, 1, −3, 1, −1}, {−1, −1, 3, −3, −1, 1, −1, 1, −3, 1, −3, 3}, {−1, 3, 3, 1, −1, 1, 3, −1, −1, 1, −1, 1}, {−3, 1, −3, −1, 1, −1, −1, −1, 1, 1, −3, −3}, {1, 1, −3, 1, 1, −1, −1, 1, −1, 3, 3}, {3, 1, −3, −3, 3, −3, −3, −1, 3, −3, 3}, {3, 3, −1, 1, −1, −3, 1, −3, −1, −3, 3, 1}, {−3, 3, −3, 3, 3, −1, −3, 3, −3, −1, −1, 3}, {−3, 3, −3, 3, 1, −1, 3, 3, −1, 1, 3, 3}, {3, 3, 3, −1, 1, 1, 3, −1, 3, 3, −1, 3}, {−3, 3, 1, 1, −1, 3, −3, 1, 3, 3, 3, −3}, {−1, 1, −1, 3, 3, −1, −1, 3, −3, 3, 3, 3}, {−3, 3, −3, −1, 3, 3, −1, −1, 3, 1, 3, 1}, {1, −3, 3, 1, 1, −3, −1, −3, −1, −3, −3, −1}, {3, 1, −1, 1, −3, 3, −1, 1, 3, 1, 3, −3}, {1, 1, −1, 3, −3, −1, −3, −3, −1, 3, 1, −3}, {−3, −1, 1, −3, −1, −1, −1, 3, 1, 3, 1, −1}, {−3, −3, −3, −1, 1, 3, −1, −1, 3, −1, 3, 1}, {−3, −3, −3, 3, 1, −1, 3, 3, −1, 3, −1, 1}, {3, −1, 3, 3, −1, 3, 1, 1, −1, 3, 3}, {−3, −1, 1, 3, −3, 3, −3, 3, −1, −3, 3, 1}, {−3, 1, 3, 1, 3, 3, 1, 1, 3, −1, −3, 3}, {−3, 1, −1, −3, −3, 1, −1, 1, −3, −3, −3, −3}, {3, −3, −3, 3, 3, 3, 1, −3, −1, 3, 1, −3}, {−1, −3, 1, 3, 1, 3, 1, 1, −3, −1, 1, 1}, {−1, −3, 1, −3, −1, 3, −3, 3, −1, −1, −1}, {−1, 3, −3, −1, 1, −3, 3, 3, −1, −3, −1, −3}, {1, 1, −3, −3, −3, −1, −3, −1, 3, −1, −3}, {−1, −1, −1, 3, −3, −1, 3, −1, 3, −1, −1}, {1, −3, −1, 3, 3, 1, −3, 3, −1, −1, −1, −1}, {−3, 3, 1, −1, 1, −3, −3, −1, −3, −3, −3, −1}, {−1, −3, 1, −3, 1, 1, −3, −1, 1, 3, 3}, {−3, 1, −3, −1, 3, 1, 1, −1, −1, 1, 3, 3}, {−1, −3, 3, 3, 3, −1, 1, 3, −3, 3, 3, 1}, {3, −3, 1, 1, −3, 3, 3, 1, −3, −1, −1}, {−1, −1, −1, −1, 3, −1, −3, 3, 1}, {1, 3, −1, 3, −1, −1, −1, −1, −1, 3, 3}, {1, −3, −3, 1, 3, 1, 3, 1, 3, 3, 3, −1}, {−1, 1, −3, 1, 3, 3, −1, −3, 1, −3, −3}, {−1, 3, 1, −3, −3, −3, −3, 1, 3, −1, 1}, {1, 3, 3, 3, 1, 3, 1, −3, 1, −3, −3, 1}, {−3, 1, 1, −3, −1, −3, 1, −3, −3, −3, −1, −3}, {1, 1, 1, 3, −1, −3, −3, 3, −1, −3, 3}, {−1, −1, 1, 3, 3, 1, 1, −1, 3, −3, −1, −3}, {−3, 3, 1, −3, −3, −1, 3, −1, 1, 1, 3}, {−1, 1, 3, 1, −3, −1, −1, −3, −3, 3, 1, −3}, {1, 3, 3, −3, −1, −1, −3, −1, 1, 1, −1}, {−3, −3, −3, −3, 3, 1, 1, −3, −3, 3, −3}, {−3, −3, −1, −1, 3, 1, 1, −1, −3, −1, 3}, {−1, 1, 1, −1, −3, −3, −3, 1, −3, 1, 3}, {−1, −3, −3, −3, −3, 1, 1, 3, −3, −1, 3, −1}, {1, −1, −3, 3, −3, −3, 1, 3, 1, −3, 1, 3}, {1, 3, −1, 3, 1, −3, 3, 3, −3, 1, 1, 1}, {−3, −3, 3, 3, 1, 3, −3, −1, −1, −1, 3, 1}, {3, 3, 3, 3, 1, 1, −3, −3, 1, −3, 1, −3}, {−3, −3, 1, −3, 3, −3, −1, −1, 3, 3, 1, 3}, {−1, −1, 3, −3, 3, −3, −3, −1, −1, −3, −1}, {−3, 1, 3, −3, −3, −1, 3, 1, 1, 1, −1, 3}, {3, −3, 3, −3, 3, 1, 1, 3, −1, −3, 3, 1, −1}, {1, −3, −3, −1, −3, 3, 3, −1, −1, −1, −3}, {1, 3, −3, 3, 1, 3, 3, 1, −1, −1, −3}, {3, −3, −3, −3, −3, −3, 3, 1, −1, 1, −3}, {−1, −1, 1, 3, −1, −1, 3, 1, 1, 1, −1, −3, 1, −3}, {3, −3, −1, 3, −1, −3, −1, −3, 1, −3}, {−3, 1, 1, 1, −3, −3, −1, 1, −1, −1, 1, 3}, {3, −3, −1, 1, −1, −1, −1, −1, 3, 1, −1}, 1, 1, 1, −1}, {3, −3, 1, 1, 3, 1, 1, −1, −3, 3, 1, 3}, {−1, 3, 1, −3, 1, 3, −1, 1, 1, 1, −3, −3}, {1, −1, 3, −1, −3, −3, 3, 3, −3, 1, 3, −3}, {1, −1, 1, −1, 3, 3, 1, −3, −1, 1, 3, −1}, {−3, 1, 3, 3, −1, 1, −3, 3, −3, −3, 3, −1}, {3, 3, −3, 3, 1, 1, 3, −1, 3, 3, 3, −1}, {1, −3, −3, 3, 3, −3, 1, 3, −3, 3, −1}, {1, 3, −1, 1, 1, 1, 1, 3}, {−1, 1, 3, 1, −1, 1, 3, 1, −1, −1, −1, −3}, {1, 3, −1, −1, 1, −1, 1, 1, −3, 3, 3, 1}, {−3, −1, −3, −1, −1, −1, 1, −3, −3, 3, 1, −1}, {−3, 3, 1, 1, −1, 3, −1, 1, 3, −1, 1, 1}, {−1, 3, −1, −3, −1, 1, 3, −1, −1, 3, 1, 1}, {−3, 1, 3, 1, −3, 3, −1, −1, 1, −3, −3, 3}, {1, −1, −1, −3, −1, 1, 1, 3, −1, −3, 1, −1}, {3, 1, 3, 3, −1, 1, −1, 1, −1, 3, 3, 1}, {3, −1, −1, −1, −3, −1, −3, 1, 1, −3, 3, −3}, {3, 1, −1, −1, 1, −1, 1, 1, −3, −1, −3, 1}, {−1, 1, 1, 3, 1, 3, 1, 1, −1, −3, −3, 1}, {1, −3, 1, −3, 1, 3, 3, 1, −3, −3, 1, 1}, {1, −1, 3, 3, 3, −3, 1, −1, −1, 1, −3, −1}, {3, −1, −3, 3, −1, 1, −3, −3, −3, 3, 3}, {−3, 3, 1, −1, 1, −1, 3, −3 3, 3, −3}, {−1, 1, −1, 3, −3, −1, −3, −3, −3, 3, −1, −1}, {3, 3, −1, 1, 1, −3, 3, 1, 3, −3, 3, −3}, {3, −1, −3, −3, −1, 1, 1, −1, −1, −1, 1, −3}, {3, −3, −1, −1, 3, −1, −1, −1, −1, −1, −3, 3}, {3, 1, −3, −3, 3, −3, 3, 3, −1, 1, 1, 3}, {3, −1, −1, 3, −1, 3, 3, 1, 1, 3, 3}, {1, 3, 3, 1, −3, 1, −1, −1, −3, 3, −1, 1}, {−1, 3, −3, −3, 3, −3, 1, −1, 3, 3, 1, −3}, {−3, −1, −1, −3, 3, −3, 3, 1, −3, −1, 3, 1}, {1, 3, −1, 1, −1, 1, −1, 3, 1, −1, 3, 3}, {−3, 1, 3, 3, −1, −3, 3, 3, −1, −3, 3, 3}, {3, −3, 3, −3, −1, −3, −1, 3, −3, 3, 1}, {−1, 1, 1, −1, 1, 3, 3, −3, 1, −1, 1, −3}, {3, 1, 1, 3, 1, 3, 3, −1, −1, −3}, {3, −3, −3, 3, 3, −3, −1, −3}, {−1, −3, −3, 1, −3, −1, 1, 3, 3, −3}, {1, −1, 3, 1, 1, 3, −1, −3, −3, 1, 3}, {1, 3, −3, −1, 3, 1, −3, 3, 1, 3, 1}, {3, −3, −1, −1, −1, −1, 3, −1, −1, −3, 3}, {−3, 1, 1, −3, 1, −3, 1, 1, 3, 3, 1, 1}, {−3, −1, 1, −3, −3, −1, 1, 1, 1}, {−1, −3, 1, −3, −1, 1, −3, −1, −1, −3}, {3, −3, −1, −3, 3, 1, 3, 1, −1, 1, 3, 1}, {1, 1, −1, −1, 1, 1, 1, −3, 1, −3, −3}, {3, 1, 3, 1, 3, −1, −3, −3, −1, 1, 3, −3}, {−3, −1, −3, 1, −3, −3, 1, 1, −3, −3, 3, −3}, {−1, 3, −3, 3, −1, −1, −3, 1, 1, 3, 1, 1}, {−1, 1, −1, 1, 1, 3, 3, −1, 1, 1, −3}, {−1, 1, −1, 1, 1, −3, −1, 3, 3, 1, −1, 1}, {3, 3, −3, 1, 1, −3, 3, 1, −1, 1, −3}, {−3, 1, 3, −3, 3, 3, 1, −1, 3, −1, −1, 1}, {3, −3, 3, −1, −3, −1, 1, 3, −3, 3, 3, 1}, {−3, 3, 3, 3, −3, −3, −1, 3, −1, 3, 3, −1}, {−3, 3, −3, −1, −1, 1, −3, −3, −1, 3, −1, −1}, {−1, 1, −1, 1, −3, −3, −1, −1, 3, 1, −1, 1}, {−1, −3, 1, −3, −3, 1, 3, −1, −1, 1, 1, 1}, {−1, −3, 3, 3, 3, −3, −3, −1, 1, −3, 1, −1}, {−1, 1, −3, 3, 1, 1, −3, −1, −3, −3, −1}, {−3, 1, 1, 1, −3, 1, 1, −1, 3, −3, −3, −3}, {3, 1, −1, −1, −1, −1, −1, 3, −1, −1, −1, 3}, {−1, 3, −3, −3, 3, −1, −3, −3, −3, −1, 1}, {1, 1, −1, 3, 3, 1, 1, −1, 1, −3, 1, −3, −3, 3}, {−3, −3, 1, 3, 1, 3, −3, −1, 1, −3, 1}, {1, −3, 1, 1, 3, −1, −3, −1, 1, −1, 1}, {3, −3, −3, 1, −3, 1, −1, −3, 3, 1}, {1, −3, 3, 3, 1, 3, −3, −1, 1, −1, 1}, {−3, 3, 1, −1, 1, −3, −1, −1, 1, 3, 1, 3}, {3, −3, 1, 3, −1, −3, −3, −1, 1, 3, −3}, {−3, −1, −3, 1, −3, −3, 1, 1, 3, 1, 3, 3}, {−1, −3, −1, 3, 1, 3, 3, −1, 3, 3, −1}, {−1, 3, 3, −3, 1, 3, −1, 3, 3, 1}, {1, −3, −1, −3, 1, 1, −3, −3, 3, −3, −1}, {3, −3, 3, 3, −1, −3, 1, 3, −3, −1, 1, −1}, {−1, 1, −3, −1, 3, −1, −1, −1, 3, 1, −3, 3}, {−1, −3, −3, −1, −1, −1, 1, 3, −1, −3, 1}, {−3, −1, −3, 3, −3, 3, 3, −3, −1, −1, −3, −1}, {−1, −3, −1, 3, 1, 3, −1, −1, 3, −1, −1, 3}, {3, 3, 1, −3, −3, −1, −3, −1, −1, 3, −3}, {−3, 3, −3, −3, 3, 3, −1, −1, −1, 3, 3}, {3, −3, 3, −1, 1, −1, −1, 3, 3, −1, 3, 3}, {3, 1, −1, 1, −3, 1, 1, −3, −1, −1, −1, 1}, {−1, 3, −3, −1, 3, 1, −3, −3, −1, −1, −1}, {3, 1, 1, −3, 3, −3, 1, −1, 1, 1, −3, −1}, {−3, 1, −1, 1, 1, 1, −1, −3, −3, 1, 1, −1}, {1, 3, 1, −3, −3, 3, −1, 1, −3, −1, −3}, {−3, 1, 3, −1, 1, −1, 1, 3, 3, 3, 3}, {−3, 1, −3, −1, −1, 1, 1, −3, 3, 3, 1, 1}, {1, 1, −3, −1, −3, −1, −3, −1, −3, −1, −1, −3, −1}, {−1, 3, 3, 3, 1, −3, −1, −1, −1, 3, −1, −1}, {−3, −1, −1, 1, −1, −3, 3, 3, 1, 3,

−3, 1}, {−1, 1, −3, 1, −3, −1, −1, 1, −1, −3, 1, 1}, {−1, 1, −3, −1, −1, 1, −1, −3, 3, 1, 3, 1}, {−3, 1, 3, −3, −3, −3, −3, 1, −3, 3, 1, 1}, {3, 3, 1, 1, 3, 3, 1, −3, −3, 1, −3, 1}, {−3, 3, −1, 1, −3, 1, 3, −3, −3, 3, 3, 3}, {−1, −1, −1, 1, 3, −1, 3, 3, 1, −1, 3, −1}, {3, 3, −3, 3, 1, −3, 3, 3, 1, −1, 1, −3}, {−3, 3, −1, 1, 3, 1, −1, 1, −1, 1, 3}, {−3, −3, −3, 1, 1, −3, 1, 1, 1, −3, 1, −3}, {−1, 1, 3, 1, −3, −1, −1, −3, −1, 1, −1, −3}, {1, −1, 1, 3, 1, −1, 1, −1, −3, 3, −3, −1}, {3, −1, 3, 1, −1, −1, 1, 1, 1, 3, −3, 1}, {−3, −3, 3, −3, −3, 1, −1, −1, 3, 1, 3, −1}, {3, 3, 1, −1, 3, 1, −3, −1, 1, 3, 1, 3}, {1, −3, −3, −1, −3, −1, −3, −1, −3, 3, 3, −1}, {−3, 1, 1, 1, 3, 1, 1, −3, −3, 1, 3, 1}, {−1, −3, −3, −1, 1, −1, 1, 3, −1, −3, 1, 3}, {3, −1, 3, −3, −1, −1, −3, −3, −3, 3, 1, −3}, {1, −3, −1, −3, −3, −3, −1, 3, 1, −3, −3, −1}, {−1, 3, 3, 1, −3, 1, −1, 1, 3, 3, 1, 3}, {−3, 3, 3, −1, −3, −1, 3, 3, −1, 1, 1, 1}, {−1, −3, −3, −3, 1, 3, −1, 3, −1, −1, 1, 1}, {−3, 1, −3, −3, −1, 1, 1, −1, −3, −3, 1, −3}, {−1, 1, −3, −3, 3, 3, −3, 1, −3, 3, −3, −3}, {3, −3, −1, 1, −1, 1, −3, 3, 3, 1, −3, 3}, {−1, −1, 3, 3, 3, 3, 1, −3, 3, −1, 3, −3}, {−3, −3, 3, 3, 1, −3, −3, −1, −1, 1, −3, 1}, {−1, 1, −1, 1, 3, −3, 3, 1, −3, 3, 1}, {1, 3, 1, −1, 1, −1, 1, 1, −3, 3, 3, −3}, {−1, −3, −1, 3, −1, −1, 3, 3, −1, −1, 1, −1}, {−1, 3, 1, −3, −1, 3, 1, 1, −3, −3, −3, −3}, {3, −3, 3, −3, 1, 1, −1, −1, 3, 1, −1, 1}, {−3, −1, 3, −1, −3, 3, −3, −1, 1, 1, 1, −1}, {−3, 1, 3, −1, 1, −1, −3, −1, 1, 1, 3, 3}, {3, 3, −1, 1, −1, 1, −3, −3, 1, −1, −3, −1}, {3, −1, 3, 3, −1, 1, −1, −1, −1, 3, −1, 1}, {−3, −3, −1, 1, 3, −3, 1, −1, 1}, {−1, 1, 3, −1, 3, 3, −3, −3, 1, −1, 1}, {−1, 1, 1, 1, −1, −3, −1, 1, 3, −1, 3, 1}, {−3, 1, 3, 3, 1, −3, 3, −3, −3, 1, −3, 3, 3}, {3, 3, 3, 1, −3, 3, −1, 1, −3, −3, −1}, {−3, 1, −3, 1, 3, 1, 1, 3, −3, −3, 1, 1}, {3, −1, −1, 3, −1, −1, −1, −3, −1, 3, 1, 3}, {−1, −3, 3, 3, −3, −3, −1, −3, 1, 3, −1, 1}, {1, −1, −1, −3, −3, −1, −3, 1, −1, 3, −3, −1}, {−3, −3, 1, 1, 1, −3, 1, −1, 1, 1, −1, 1}, {−3, 3, 3, 3, 3, 1, 1, −3, −3, 1, −1, 3}, {−3, −1, −3, 3, −1, −1, −3, −1, −3, −1, 3, 3}, {3, 3, 3, 1, 1, 1, −3, −1, 3, 1, −1, 3}, {−3, −3, −3, 1, 1, 1, −3, −1, 1, −1, −3, 1}, {1, 1, −3, −3, 3, 1, −1, −1, −3, −1, −1, 3}, {−1, −1, 3, 3, −3, −3, 3, 3, 1, −3, 1, −3}, {−3, 1, 1, −3, −3, 1, 3, −1, 1, −1, −1, −1}, {3, 3, −1, 1, 3, −1, 1, −1, 1, −1, 3, 1}, {1, −1, 1, 1, −3, −3, −3, 3, 1, −3, −1, 3}, {−1, 1, 3, 3, −1, −3, 1, −1, 1, −1, −1, −3}, {−3, −1, −3, 3, −3, 3, −3, 1, 1, −1, 3, 3}, {1, −1, −1, 3, −3, −3, −1, 3, 1, 3, −1}, {3, −3, 1, 1, 3, 1, −1, −3, 3, 3, −1, −3, −3}, {3, −3, 3, 1, 3, −3, 1, −1, −1, 1, 3, 1}, {1, 1, −3, −3, −3, 1, 3, 1, −3, 1, 1}, {−1, 1, 1, −1, −3, −1, 1, −1, −1, 1, −3, 3}, {3, 1, −3, 3, 3, −3, 1, 3, 3, −1, 1, 1}, {3, −3, 3, 3, −1, −1, 3, 1, 3, −1, −1}, {3, 1, 3, −1, −1, 1, 1, −1, −3, 3, 1}, {−3, −1, −1, 1, 1, −3, 3, −1, 3, 3, 3}, {3, 1, 1, −3, −3, −3, −3, 3, 3, −1, 1, 1}, {3, −1, 1, 1, −1, −3, −1, 1, 1, 1, −1}, {3, 1, 3, −1, −1, 3, 3, −1, 3, −3, 3}, {1, 3, −3, 1, −3, −3, 3, 1, 3, −1, −1}, {−1, −3, −1, −3, −3, −3, 1, −1}, {−3, 1, 3, −1, −3, −1, −1, 3, 3, 3, 3}, {−1, 1, 1, −3, −1, −3, 1, −1, 3, 3, 3}, {1, 1, 3, 3, 1, 3, 1, −1, −3, 1, 3, −1}, {−1, 1, −3, −1, −1, −1, −1, 3, 3, 1, −3, 3}, {1, −1, 3, 1, −3, −1, −1, 1, 3, 1, 1, −1}, {1, 3, 1, 3, −3, −3, −1, 3, −3, 3, 1, −1}, {−1, −1, 3, 3, 3, 3, 3, −1, 1, −3, 3, −1}, {1, −3, 1, 1, 1, −3, −1, −3, 1, 1, 1}, {3, −3, −1, 1, −3, −3, 3, −1, 3, 1, 3, 1}, {−1, 1, 3, 1, 1, −3, −1, −1, −1, 1, −3}, {3, 3, −1, −3, −3, 3, −3, −1, 3, 1, 3}, {−3, −1, −3, 3, −1, −1, 3, 1, 3}, {3, −1, −3, 3, 3, 3, 1, 1, 3, −3, 1, −3}, {3, −3, 1, 3, 1, −1, −3, 1, −1, 1, 3, 3}, {−3, 1, 1, 1, −1, 3, 3, −1}, {1, −1, 1, −1, 3, 1, 1, 1, −3, −3, −3, 3}, {3, 3, −1, −3, 1, 3, 1, 3, −3, −1, −3}, {−1, 3, 1, −3, −1, 1, 1, 1, −3, −3, 3, 3}, {−1, 3, −1, 3, 3, 1, 3, 1, −3, −1, −3}, {−1, −1, −1, 1, −1, 3, 1, −3, 3, 1, −3}, {−3, −3, −1, −1, 3, −1, 1, −3, −3, −3}, {3, −1, 3, −3, 3, 1, −1, 3, 3, −1, 1, 1}, {1, −3, 3, −1, 1, 1, −1, 3, −3, −1, −3, −3}, {1, 1, −1, −1, 1, 3, −3, 3, −3, 1, −1, 3}, {−1, 1, −3, −3, −3, −1, −1, −3, 1, −3, −3}, {−3, 3, −1, 1, 1, −1, 3, −3, −1, 3, −3}, {−1, −1, −3, 3, 1, 3, 3, −1, 3, 1, 3}, {−3, 1, −3, −1, 1, 1, −3, 1, −1, −3, −3}, {−3, −1, 1, 1, 3, −3, −3, 1, −3, −1, −3, −3, 1, −3, −3}, {−3, −1, 1, 3, −3, −3, −3, 1, −3, 1}, {1, 3, 1, 1, −3, −3, −1, 1, 1, −3}, {−3, −1, −1, 3, −1, −3, −3, −1, −1, −1}, {−1, −1, 3, −1, 3, −1, −3, −1, −3, −3}, {1, 1, −1, −1, 3, 1, −1, −3, −1, 1}, {3, −3, 3, −1, 1, −1, −3, −1, 3, −1, 1}, {−1, −1, −3, −3, −1, −3, −1, −3, 1, 1, −3}, {3, −1, −1, −3, −1, −3, 1, 3, −3, −1, −3, 1}, {1, 1, −1, −1, −1, 3, 1, 1, −3, 3, 1}, {−3, −1, −1, −3, −1, 3, −1, −1, −3, 3, −3, −1}, {−1, 1, 1, 3, −1, −1, −3, −3, 3, −1, −1}, {1, 3, 3, −3, 1, −3, 3, 1, −1, −3, 3, −3}, {−1, −1, −3, −3, −1, 3, −1, −1, 1, 1, 3}, {3, −1, −3, −1, 1, −3, 3, 1, 1, 3, −3}, {3, 1, −3, 1, 3, −3, −1, 1, 1, 1, −1, −3}, {1, 3, −1, 3, 3, −3, −1, 1, 1, 1, −3}, {3, 1, 3, 1, −3, −3, −1, 3, −3, −1}, {1, 1, 1, −3, −3, 1, −1, 3, 3, −3, 3}, {1, −1, −3, −3, −3, −1, 3, 1, −3, 1, −3}, {−3, −1, −3, −3, −3, −3, −1, 1, −3, 3, 3, −1}, {3, −3, 3, 1, −1, −3, 3, 3, 3, 1, 3}, {3, 3, −1, −1, −3, 3, 3, 3, −3, −1}, {3, 1, −3, −1, −3, 3, 3, −3, 1, −1, 3, 3, −1}, {−3, −1, −3, 3, 3, 1, 1, −1, 1, 3}, {1, −1, 1, 1, −3, −3, 1, 3, −3, 3, −1}, {1, −1, 1, −3, 1, 3, −1, −3, −1, 3}, {3, −1, −1}, {3, −3, 3, −1, 3, 3, −3, −3, −1, 1, 3, −3}, {−3, 3, −1, −3, −1, −1, 1, 3, 1, 1, −1, −3}, {−3, 3, 1, −1, 3, −1, 1, 3, 1, 1}, {1, −1, 1, 1, 1, −3, −1, 3, 1, −3, −3, 1}, {1, −1, −1, −1, 1, −1, −3, −1, 3, 3, 1}, {−3, 1, 3, −1, −3, −3, 3, −3, 3, 1}, {1, −3, −1, 3, −1, −3, −3, 3, 3, 3}, {−3, 3, 1, −1, 3, −1, 1, −3, −1, −1, −1}, {3, −3, 3, 3, −1, 1, 3, 1, −1, −1, −3, 3}, {−1, 1, −1, −3, 1, 1, 1, 3, 1, −3, 3}, {1, 3, −1, −1, 1, −1, 1, 3, 1, −3, −3, 3}, {−3, 3, −3, 3,

−3, 1, −1, 1, 3, −3, 1, 1}, {1, 1, −3, 1, 3, 1, 1, 1, −3, −3, −1, −3}, {−1, 1, −3, −1, 3, 1, 3, 1, −1, −1, 1, 1}, {3, −3, −3, 1, −3, 3, −3, −3, 3, 1, −1, −1}, {−1, −3, −1, −3, 1, 1, 1, −1, 1, 3, −1, −1}, {−1, 3, −1, 3, −3, −1, 1, 1, −3, 3, 3, 3}, {1, −3, −3, 1, −3, −3, −1, 1, −1, 3, 1, −3, −3}, {−1, 1, −1, −1, 3, 1, 3, −1, −3, −1, 1, 3, 1}, {3, −3, 1, 3, 1, 1, 1, −3, 3, 1, −3, 3}, {−1, −1, 3, 3, 3, 3, −1, 3, 1, −3, 1, 3}, {3, 3, −3, −1, 1, 1, −1, 1, −3, 1, 1, −1}, {−1, −3, 3, −3, −3, −1, −1, −1, 1, −3, −1, 3}, {1, 1, −1, −1, 3, −3, 3, −3, −1, 3, 1, −3}, {−1, −1, 1, 1, 1, 3, 1, −1, 1, 3, −3, 1}, {1, 1, −1, −3, 3, −3, 3, −3, −1, 3, 3, −3}, {−3, −3, −3, 1, 3, 3, 3, 1, −3, −3, 1, −3}, {1, 1, 3, 1, 1, −3, −1, 3, 1, 3, −1, −1}, {3, −3, −3, 3, −3, 1, −1, −1, 3, 1, −3, −1}, {−3, −3, 3, −3, −1, 1, 1, 1, −3, 1, −1, 3}, {3, 1, 3, 1, 3, −3, 3, −3, −1, 1, 3, −3}, {1, −1, −1, 1, −3, −1, 3, −1, −3, −1, 1, 1}, {3, −1, −3, 3, −1, −3, −3, −3, 1, 3, 1, 3}, {−3, −1, −3, −1, 1, 3, 1, −1, 3, 1, −1, −1}, {−1, 3, 1, 3, 3, 3, 1, 3, −1, −1, 3}, {−3, −1, −1, 3, −3, 3, −3, −1, −3, −3, 1, −1}, {1, 3, −3, −1, 1, −3, 1, −3, 1, −1, −3, 3}, {3, −3, 1, −3, −1, −3, 3, 1, 1, 3, 3, −1}, {3, −1, −1, 3, −3, 3, −1, 1, 1, 1, −3}, {3, 1, 1, −1, 3, 1, −1, 1, −1, 1, 3, −3}, {1, 3, 3, 3, −3, −3, 1, 1, −3, −1, −3, 3}, {1, 3, −1, 3, 1, 1, −1, −1, 3, 3, −3, 3}, {−1, −1, 1, 3, 3, 3, 3, 1, −1, 3, −3, 1}, {1, −3, 1, 3, 3, −3, −3, −3, −3, 3, 3, 1}, {−3, 1, 1, −3, −3, −1, −3, −3, −1, −3, −1, 3}, {−3, −3, 3, 3, 1, −3, 1, 3, −1, 3, −3}, {−1, 1, 3, −1, 3, 1, −3, −1, −1, −1, −3, 3}, {1, 3, −1, −1, 1, −1, −3, 3, −1, −3, −1}, {−3, −1, 3, −3, −1, −3, −1, 3, −1, −3}, {3, −1, −3, −1, −1, 1, 1, 3, 1, −1}, {−1, 3, −3, −3, −1, 3, −3, 3, −1, 1, 1}, {1, −1, −1, 1, 1, −3, −1, 1, −1, 3, −3}, {3, −1, −1, 1, −1, 1, 1, −3, 3, −3, 1}, {1, 3, 1, 3, −1, −1, 1, −3, 1, −1, −3, 3}, {3, 1, 3, 1, 1, −3, −3, 3, −3, −1, −1, 3}, {−3, 3, 3, 1, −3, 1, −1, −1, 1, −3, −1, 1}, {1, 3, 3, −3, −3, 3, −3, 3, 1, −3, −1, 3}, {−3, 1, −1, 3, −3, −1, −1, −1, −1, −3, 3, 3}, {3, −1, 3, 1, −1, −1, 3, 3, −3, −1, 3}, {−3, −1, −3, −1, −3, −3, 1, 3, −3, −3, 1, −1}, {−1, 3, −3, 1, 1, −1, −3, −1, −1, −1, 1, 1}, {1, −3, −3, 3, −3, −3, −3, 1, −1, 1, −3, −3}, {−1, 1, 1, 1, −1, −1, −3, −1, 3, 3, −1}, {3, −3, −1, −3, −3, 3, 3, 3, 1, −3, 3, −1}, {−3, 1, −3, −1, 1, −3, 3, 3, 3, −3, 3, 1}, {−1, −3, 1, −1, 3, 3, 3, 3, −3, 1, 3, −1}, {−3, −1, 1, −3, −1, −1, −3, 1, −3, 3, 3, 1}, {3, 3, −3, 3, 1, −3, −3, −1, 3, −1, 3, −3}, {3, 1, 1, 1, 3, 3, 3, −1, 3, −1, −1, 3}, {−1, −1, 1, 1, −3, −1, 1, −3, 1, 3, 1, −1}, {1, 1, 1, −3, −1, −3, −1, −3, 1, −1, −3, 1}, {−1, 1, −1, 1, −3, −3, −1, 3, 3, −1, 3}, {3, −1, 1, −3, 1, 1, 3, −3, 3, 1, 3, 3}, {−1, −1, −1, −1, 1, 3, −1, −3, −1, 3, 3, −1}, {3, −3, −3, −1, 1, 1, −3, 1, 3, 1, 1, −1}, {3, 3, 3, −3, 1, 3, 1, −1, −3, 1, 1, −3}, {−1, −1, 3, 3, 1, 3, −1, −3, −1, 3, 1, 3}, {3, 1, 3, 1, −1, 1, 1, 3, 3, −1}, {3, 3, −3, −1, −3, 3, 3, −3, −1}, {−3, −3, −3, 3, −3, 3, 3, −3, −1}, {3, −1, 1, 1, 3, 3, 1, 3, −1, −1, −3, 1}, {1, −1, 1, 1, −3, −1, 3, 1, 3, −1, 1, 3}, {3, 1, 3, 1, 1, 1, 1, 1, 3, 3, 1, 3, −3}, {3, 1, 3, −1, −1, 3, 3, 1, −3, −3, 3}, {3, 3, −3, −3, 3, 3, −3, −3, −3, −3, −3, 1}, {−3, 3, 3, 1, −3, 1, −3, −1, −1, −3, −3, −3, 3}, {3, 1, 1, 3, 3, 1, −3, 1, 3, −1, −3, 3}, {3, −1, 1, 1, 3, −1, −3, −3, 1, 3, 1, −1, −3, −3}, {−1, 1, 3, −1, 3, 3, 3, −3, 1, 3, −1}, {1, 1, 3, 1, 3, 3, 3, 1, 3, 3, 3, −3, 1, −1}, {1, 3, −3, 3, 3, 3, 3, −1, −3, −1, 3, 1, 3, 1, 3}, {−3, 1, 3, −1, 3, 3, 3, 3, 1, 3, 3, 3, −1, 3, 1}, {1, −3, 1, 3, 3, 3, 1, 3, −1, −3, −1, 3, 3, 3, 3}, {3, −3, 3, 1, 3, 1, 3, 1, −3, 1, 3, 3, 3, 1, 3, −1}, {3, −3, 3, 3, 3, 1, 1, −1, 3, 3, 3, 1, 3, −1, 1, −1, 3, −3, 3, −1, −1}, {1, 1, 1, 1, −3, 3, −3, 1, 3, −1, 3, 3, −3, 1, −3, −3, −1, −3, 3, 3, 3}, {3, 1, 3, 1, 3, 3, −3, −3, −3, 1, −3, 3, 3}, {−3, −3, −3, −1, −3, 1, 3, 1, 3, −1, −1, 3}, {3, 1, 3, 3, 3, 1, 1, −1, 3, −3, −3, 1}, {−3, 1, −3, −1, −1, 3, 1, −1, −3, −3, −3, −3, −3}, {−3, 3, 3, 1, 1, −3, 1, −3}, {3, −3, 3, 1, −3, 1, 3, 1, 3}, {−3, −1, 1, −3, −3, −3, −3, 1, 1, 3}, {1, 1, −3, 1, 1, −1, −1, −1, −3, 1, 1, 3}, {3, −3, 3, 1, 3, 1, −3, −3, 1, 1, 1, 3}, {3, −1, −1, 1, −1, 1, 1, 1, 3}, {−1, 3, 3, −1, −1, 3, −1, 3}, {1, 1, 1, −3, −3, −3, 1, −3, 1}, {−1, −1, 1, −3, −1, −3, 3, 3, −1, −3, −3}, {3, 3, 3, 1, 1, 3, −1, −3, −3, 1, 1, −3}, {1, 3, −3, −1, 3, −1, −1, −1, 1, −3, 1}, {−1, 3, 1, 3, −1, 1, 3, 1, 1, −1}, {−3, −3, −3, −1, −3, −1, 3, 1, 3, −1, −1, 3}, {3, 1, 3, 3, 3, 1, 1, −1, 3, −3, −3, 1}, {−3, 1, −3, −1, −1, −3, 1, −1, −3, −3, −3, −3, −3}, {−3, 1, 3, −1, −1, −3, −3}, {3, −3, 3, 1, −3, 1, 3, 1, 3}, {−3, −1, 1, −3, −3, −3, −3, 1, 1, 3}, {1, 1, −3, 1, 1, −1, −1, −1, −3, 1, 1, 3}, {3, −3, 3, 1, 3, 1, −3, −3, 1, 1, 1, 3}, {3, −1, −1, 1, −1, 1, 1, 1, 3}, {−1, 3, 3, −1, −1, 3, −1, 3}, {1, 1, 1, −3, −3, −3, 1, −3, 1}, {−1, −1, 1, −3, −1, −3, 3, 3, −1, −3, −3}, {−3, 1, −3, −1, −1, 3, 1, 3, −1, −1, −3, −3, −1, −3}, {3, 3, 3, 1, 1, 3, −1, −3, −3, 1, 1, −3, 3}, {1, −3, 1, 1, −1, 1, −1, −3, 1, 1, 1, −3}, {3, 3, 3, 1, 3, −1, −3, −3, 1, 1, −3}, {1, 1, −3, −3, 3, −3, −1, −1, −3, −3, −3, 1}, {−1, 3, −3, 1, 3, −1, 1, −3, −3, −1}, {−3, −3, 3, −3, −3, 3, −1, −1, −1, 1}, {−1, 1, 3, −3, 3, −1, −3, 3, −1, −1}, {−3, −3, 1, 1, −3, −1, −3, 1, 3, 1, 3, 3}, {−1, −1, 1, −3, −1, −3, 3, 3, −1, −3, −3}, {3, 3, 3, 1, 1, 3, −1, −3, −3, 1, 1, −3}

1, 1, 3}, {−3, −3, −3, 1, 1, −1, 1, −1, −3, 1, −3, −1}, {1, 3, −1, 1, 1, 1, 3, 1, −3, 3, −1, −1}, {−1, −1, 3, 3, −1, 3, −1, 1, −1, −1, −1, 1}, {−3, 3, 1, 1, −3, −1, −3, 1, 1, 3, 1, 3}, {−1, −1, −1, −3, 1, 3, −3, −1, 1, −1, 3, −1, −1}, {3, −3, 1, −1, 1, 3, −3, −3, 3, −3, −3, 3}, {−3, 3, 3, 1, −3, −3, 3, −1, −3, −1, −1, 1, −3}, {3, 1, 1, 1, 3, −3, −1, 3, 3, −1, 3, −1}, {−3, −3, −3, 1, 3, −1, 1, −1, −3, 1, −1, 1}, {1, −1, 3, 3, 1, 3, −3, −1, 3, 1, 3, 1}, {−3, −1, 1, −1, 1, 3, −1, −3, 3, −3, 3, 1}, {3, 1, −1, −1, −3, 1, 1, 3, 1, 3, −1, 1}, {1, −1, −3, −1, 1, −1, 1, 3, −3, 3, 1, 3}, {3, 1, 3, −3, −3, −3, 1, 1, −3, −3, 1, −3}, {−3, 1, 1, 1, 3, 1, −1, 3, −3, 3, 3, −1}, {−1, 3, −1, 3, 3, −3, 3, 3, 3, −1, −1, −3}, {−3, 3, −3, 3, 3, −1, −1, −3, 1, 3, −3, −3}, {1, −1, −1, −1, 1, −3, 3, −3, 3, −1, −1, 3}, {1, −1, 3, 1, 3, 3, −1, −1, −3, −1, 3, −3}, {1, −1, −1, −1, 3, −1, 3, 3, 3, −3, −1, 3}, {−1, 1, −1, 3, 1, −1, −1, −1, −1, 3, −3, 1}, {3, −3, 1, −3, −1, −1, 3, 3, 1, −1, 1, 1}, {−1, −1, 3, 3, −3, −3, 3, 3, −1, 3, −1, 3}, {1, −3, −3, 1, −1, 3, 3, 3, 1, 3, 1, 3}, {−1, 3, 1, −3, −3, −1, 3, −3, 1, −3, −3, −3}, {−3, 3, −1, 3, −3, −1, 1, 1, −3, −3, −3, −3}, {−3, −3, 1, 1, 1, 3, 1, 1, 3, 1, −3, 1}, {1, −3, −1, 1, −1, −3, −3, 1, 1, 1, 3}, {−3, −3, 3, 3, −1, 3, −1, −3, −1, −1, 1, 3}, {−1, −1, 1, 1, −3, −3, 3, −3, 1, −1, 3, −1}, {−3, −1, 3, −1, 3, 3, −3, −3, 3, 3, 1, −1}, {−3, 3, −1, 1, −1, 3, −3, −1, 1, −1, −1, 1}, {3, 1, 1, 1, 1, −3, 1, −3, 1, 1, 3, −3}, {1, 3, −1, 3, 1, −1, 1, 3, −3, 3, 1}, {3, 1, −1, −1, −1, 1, −1, 3, −1, 1, 3, −1}, {−1, −3, −3, 3, −3, 1, −1, 1, 3, 1, 3, 3, −1, −3}, {1, −3, 3, 1, −1, −3, −3, −3, −3, −3}, {−1, 1, 1, −3, −3, −3, −1, −3, −3, 1, −3, 1}, {−3, 3, −1, 3, −3, −1, −3, 1, −3, 1}, {1, −3, 3, 1, −1, −3, −3, −3, −3, −3}, {−1, 1, 1, 1, 3, −3, 3, 1, −3, −1, −3, −3, −3, −3, −3, −3, 1, −3, −1}, {−3, 3, 1, −3, −3, −1, 1, −1, 3, −3, −3, −3, 3, −3, 3}, {−1, 1, 1, 1, 3, 1, 3, 1, 1, 3, −3, 1, 1, 3, 3, −1, 1, −3, 3, 3, 3, 1}, {1, −3, 3, 1, 1, −3, −1, 3, 1, −1}, {3, 3, −3, −3, −1, −3, −3, 3, 1, −3, −1, 3}, {−3, 1, −1, 3, 3, −3, 3, 3, 1, 1, −1, −1}, {−1, 1, 3, 1, 3, 1, 3, 1, −1, −1, −1}, {3}, {1, −3, 1, 1, −1, −1, −3, −3, −1, −1, 1, 1}, {−1, −3, −1, 3, 3, 3, 3, −3, −3, 3, 1, −3}, {−1, 1, −1, 1, 1, 3, 1, −1, −1, 3, 3, −1}, {3, −3, −3, −1, −1, −3, −3, 3, 1, −3, 1, 1}, {−3, −3, 3, 3, −3, −3, −1, 3, −1, 3, 1, −1}, {1, −3, 3, 3, −3, 3, 3, −3, 3, −3, 3, −3}, {−3, −1, 1, −1, −3, 1, −1, 3, −3, 3, 3, 1}, {−1, −3, 3, 1, −1, 1, −1, 1, −1, 1}, {−3, −3, 1, −1, 1, −3, −1, −1, 1, −1, 1, 1}, {−3, 1, −1, −3, −1, 1, 3, −3, 3, 3, 3, 1, 3, −3}, {3, 3, 1, −3, −3, −1, 3, 3, 1, −1, 1, 1, 1, 1, 1, 1, 3}, {1, 3, −3, −3, −1, 1, 1, −3, 3, 1, −3}, {−1, 3, 1, 3, 3, −3, −1, −1}, {−1, −3, 1, −1, 1, 1, 1, −1}, {3, 1, 1, 1, −3, 1, 1, 3, 1, 3}, {1, 1, 3, −1, 1, 1, 1, −3, 3, −1, −3},

{1, 1, 1, 3, −1, 3, −1, −3, −3, 1, 1, −3}, {−1, 3, −3, −1, 3, 1, −3, −3, −3, −3, −1, −1}, {−1, −3, 1, 3, 1, −1, 3, 3, 1, 3, −3, −1}, {3, −3, −1, −3, −1, 1, 1, −1, −3, −1, −3, 3}, {−3, 1, 3, −1, 1, −3, 3, 3, 3, −3, 3, 1}, {3, −3, 3, 1, −3, −3, −3, −1, 3, 3, 1, 3}, {1, −3, −3, 3, 1, −1, 1, −3, −3, −3, 3, 3}, {−3, 1, −1, 3, 1, 1, −1, −1, −1, 1, 3, 1}, {1, 3, 1, 3, 1, −1, −3, −3, 1, 3, −3, −3}, {3, 1, −3, 3, −3, −3, 3, 3, 1, −1, 1, 3}, {1, 1, 3, −1, −1, 1, −3, 1, −3, −3, 3, −1}, {1, −1, −3, −3, 3, −3, 1, −3, 1, 1, 3, 3}, {−1, −1, −3, 3, 1, −3, −1, −3, −1, −3, −1}, {1, −3, −3, 1, 1, −1, −3, −3, −3, −3, −3, −1}, {−1, −1, −3, 3, −3, −3, −1, −1, 1, −3, −1, 3}, {3, 1, 1, 1, −3, 3, −1, −3, 1, 3, −1, 1}, {−3, −1, 1, 1, 1, −3, 1, 3, 1, −1, 1, −1}, {−3, −3, −3, 3, 3, −1, 1, 3, −3, 3, −1, −3}, {−3, −3, −1, −3, 1, 3, −1, 1, −3, −3, −3, −1}, {3, 3, −1, −1, −1, 3, −1, 3, −1, 3, 3}, {1, −3, −1, −1, 1, −3, 1, 1, −3, 3, 3, 1}, {1, −3, 3, 1, −3, −1, 3, 3, 3, 1, 1}, {−3, 3, −3, −1, 3, −1, −3, 1, −1, −1, −3, −3}, {−1, −3, −1, −3, 3, −3, −3, −3, 1, −3, −1, 1}, {3, −1, −1, 3, 1, 1, 1, 1, −3, −1, −3, 1}, {−1, −3, 1, −1, 1, 3, −3, −3, −3, 3, 3, −1}, {3, 1, −3, −3, −3, 3, −3, −3, 3, −1, 1, 3, −1}, {1, −3, 1, 1, −3, −3, 1, 1, 1, −1, −3, −1}, {−3, −1, −3, −1, 3, 3, 1, 3, 3, −1, −3, 3}, {1, −3, −1, 1, −1, −3, 3, −3, −1, −1, −1, −3}, {3, −3, 3, −1, −1, 1, −3, 1, 1, −3, −1}, {−3, −1, −3, −1, 1, 1, −3, −1, −1, 3, 1, −1}, {−1, −3, −3, 3, −3, −1, 1, 1, −3, 3, −1, 3}, {3, −3, −3, −3, 3, −3, 1, −3, 1, 1, −3, −3, −3}, {−1, −3, −1, −3, 1, 1, 3, 1, 1, −3, −1, 1}, {−1, −3, 3, 3, −3, −3, −3, −1, −1, 3, 1, −1, −3, 1}, {−1, −3, −3, 3, 1, −3, 1, −1, 3, −3, −3, −3, −3, 3, 3}, {1, 3, −1, −1, −3, −3, 3, −1, 1, 1, 3}, {1, −1, 3, 1, 1, 1, −1, −3, −1, −3, 1, 3}, {−3, −1, −3, −1, −1, −3, −3, 1, 3, 3, −1, −1}, {3, −3, 1, 3, 3, −3, −3, 3, 1, −1, 3, −1}, {3, −1, 1, 3, −1, −3, −1, −3, −3, 1, −1}, {−3, 1, −1, −3, −3, 1, 3, −1, −1, 3, −3, 1}, {3, −1, −3, −1, 3, 3, 3, 3, 1, −3, −3, 1}, {−1, 1, 3, −1, −1, −1, −3, −1, 3, 1}, {−3, −1, 3, −3, 3, 1, −1, −1, 1, 1, −3}, {1, 3, −1, −1, −1, 1, −1, 1, −3, 3, 1, −3}, {−1, 1, −1, 3, 1, −1, 1, −3, −1, 3, 3, 3}, {1, 3, 1, 3, −3, −1, 3, 1, 3, −1, −3}, {3, −3, −1, −3, −3, 3, 3, −3, 1, −1, 3, 1}, {−1, 1, −3, −1, 1, 3, 1, 1, −1, 3, −1, −3}, {1, 1, −3, −3, 3, −1, −1, 1, −1, 1, −1}, {−1, −1, −1, 3, 3, 3, −3, −1, 3, −1, −3}, {1, 1, −1, −3, 1, 3, 3, −3, −3, 1, −3}, {−3, 1, 1, −3, −1, 1, 3, 3, 1, 3, 1, 3}, {−1, 3, 3, 1, 1, 1, −3, −1, −1, 1, −1, 3}, and {−1, 1, 3, 1, −3, 3, −1, 1, 1, −1, −1, −3}, {1, 1, 1, 3, −3, 3, 1, 1, −3, 1, 1, −3}.

Further, based on the sequence-based signal processing method disclosed in this embodiment of this application, for the sequence {s_n} related to the sequence {f_n} that consists of the 12 elements and that is determined in S101, the sequence {s_n} consisting of elements s_n may be a sequence in a fourth sequence set or an equivalent sequence of a sequence in a fourth sequence set. All peak-to-average ratios of sequences in the fourth sequence set are less than 3 dB, and a value of a correlation between any cyclic shift of any sequence in the fourth sequence set and any cyclic shift of another sequence is less than 0.6875.

In a specific implementation, optionally, the sequences in the fourth sequence set include:

{−3, 3, 3, 1, −1, −3, 1, −3, −1, 1, 1, 3}, {−3, 1, 3, −1, 3, 1, −1, −1, −1, −1, 1, 1}, {3, 1, 3, 1, 3, 1, 3, −3, −1, −3, 3, 1}, {1, 3, 1, −1, 1, −1, −3, −1, 1, −1, 1, 3}, {3, −1, 3, −1, −1, −1, −1, 3, 3, −1, −1, 3}, {−3, 1, 3, 1, 3, −3, −3, −3, 3, −1, −3, 3}, {−1, −3, 3, −1, −3, −3, −3, −1, 1, −1, 1, −3}, {−1, 3, −1, −1, −1, 3, −1, 3, 3, −1, −1, −1}, {1, −3, 1, 1, −3, −3, −3, 1, −3, −3, −3}, {−1, 1, 3, −3, 1, −1, 1, −1, −1, −3, 1, −1}, {1, 3, 3, −3, 1, 3, 3, 3, 1, −1, −3}, {3, −3, 3, −3, 3, −1, 1, 3}, {1, −1, −3, 3, −3, −1, 1, −3, −3, 3, −3}, {3, −1, −3, 3, −3, −1, −3, 3, −3, −1, −3}, {1, 3, 1, −3, 3, −1, −1}, {−3, −3, −3, −1, −1}, {−1, −3, 3, −3, 1, −3, −3, −3, −1, 1, 3, 1}, {−1, −1, −1, 3, −3, −1, −3, 3, −1, 3, −1, −1}, {3, 3, −1, −3}, 3, 1, 3, 1, −3, 1, −3, −1}, {1, −3, 3, 1, −1, −1, 3, 3, 3, 3, 1, 3}, {−3, −1, −3, 3, −1, 1, −1, 3, −3, −1, −3, −3}, {1, 3, −1, −1, 1, −1, 1, 1, −3, 3, 3, 1}, {3, −1, −1, −1, −3, −1, −3, 1, 1, −3, 3, −3}, and {3, 3, −1, 1, −1, 1, −3, −3, 1, −1, −3, −1}.

Further, based on the sequence-based signal processing method disclosed in this embodiment of this application, for the sequence $\{s_n\}$ related to the sequence $\{f_n\}$ that consists of the 12 elements and that is determined in S101, the sequence $\{s_n\}$ consisting of elements $s_n$ may be a sequence in a fifth sequence set or an equivalent sequence of a sequence in a fifth sequence set. All peak-to-average ratios of sequences in the fifth sequence set are less than 2.63 dB, and a value of a correlation between any cyclic shift of any sequence in the fifth sequence set and any cyclic shift of another sequence is less than 0.8.

In a specific implementation, optionally, the sequences in the fifth sequence set include:

{−3, 3, 3, 1, −1, −3, 1, −3, −1, 1, 1, 3}, {−3, 1, 3, −1, 3, 1, −1, −1, −1, −1, 1, 1}, {3, 1, 3, 1, 3, 1, 3, −3, −1, −3, 3, 1}, {−3, 3, 1, 3, 1, −1, 1, 3, 1, 3, −3, 3}, {1, 3, 1, −1, 1, −1, −3, −1, 1, −1, 1, 3}, {3, −1, 3, −1, −1, −1, −1, 3, 3, −1, −1, 3}, {−1, 3, 3, −1, −1, 3, −1, 3, −1, −1, −1, −1}, {−1, 1, 3, −3, 3, 1, −1, −3, −1, −3, −1, −3}, {−3, 1, 3, 1, 3, −3, −3, −3, 3, −1, −3, 3}, {−1, −3, 3, −1, −3, −3, −3, −1, 1, −1, 1, −3}, {1, 3, −3, −1, −3, 3, 1, −1, −3, −1, −3, −1}, {3, −1, −1, 3, 3, 3, 3, 3, −1, 3, −1}, {−1, 3, −1, −1, −1, 3, −1, 3, 3, −1, −1, −1}, {1, −3, 1, 1, −3, −3, −3, −3, 1, −3, −3, −3}, {3, 1, −3, 1, 3, 1, −1, 1, 3, 3, 3}, {1, −3, 1, −1, −3, 1, 3, −3, 3, 3, 3, −3}, {3, 1, 1, −1, 3, 1, 3, 1, 1, 3, −3, −1}, and {−3, 1, −3, 1, 3, 3, −1, −1, −3, −3, −1, −1}.

Further, based on the sequence-based signal processing method disclosed in this embodiment of this application, for the sequence $\{s_n\}$ related to the sequence $\{f_n\}$ that consists of the 12 elements and that is determined in S101, the sequence $\{s_n\}$ set is a set of sequences used by the communications system.

Optionally, an $\{s_n\}$ set that includes the sequence $\{s_n\}$ consisting of elements $s_n$ may be a subset in a sixth sequence set. All peak-to-average ratios of sequences in the sixth sequence set are less than 3.0 dB, and a value of a correlation between any cyclic shift of any sequence in the sixth sequence set and any cyclic shift of another sequence is less than 0.68.

In a specific implementation, optionally, the sequences in the sixth sequence set include:

{−3, −3, −3, −3, 1, 1, −3, −3, 1, −3, 1, −3}, {1, −3, 1, −3, 1, 1, −3, −3, 1, 1, 1, 1}, {−3, 3, 3, 1, −1, −3, 1, −3, −1, 1, 1, 3}, {−3, 1, 3, −1, 3, 1, −1, −1, −1, −1, 1, 1}, {3, 1, 3, 1, 3, 1, 3, −3, −1, −3, 3, 1}, {−3, 3, 1, 3, 1, −1, 1, 3, 1, 3, −3, 3}, {−3, −1, −3, 3, 3, 3, −1, −3, 3, −3, −1}, {1, 3, 1, −1, 3, −1, 3, 3, 1, −1, 1, 3}, {1, −1, 1, −1, −1, 1, 3, 3, −1, −1, −3, 1}, {1, 3, 1, 3, 3, 1, −1, −1, 3, 3, −3, 1}, {−3, 1, 3, 1, 3, −3, −3, −3, 3, −1, −3, 3}, {−1, −3, 3, −1, −3, −3, −3, −1, 1, −1, 1, −3}, {−1, 1, 3, −3, 1, −1, 1, −1, −1, −3, 1, −1}, {1, 3, 3, −3, 1, 3, −1, −3, 3, −1, 1, 3}, {3, 3, 3, −3, 1, 3, 3, −3, 1, −1, −3, 1}, {−3, −3, 3, 1, 1, 3, −1, 1, 1, 3, −1, 3}, {−3, 1, −3, −1, −1, 1, −3, −1, −1, −3, 3, 3}, {3, −1, −3, 3, −3, −1, 3, 3, 3, −1, −3}, {1, 3, 1, −1, 3, −1, −1, −3, 3, −3, −1, −1}, {−1, −1, −1, −1, 3, 1, −3, −3, 1, 1, −3, −1}, {−3, −3, −1, 1, −1, 1, 3, 1, −1, 1, −1, −3}, {−3, 1, 1, −3, −1, 3, −3, −1, 1, 1, 1}, {1, −3, 1, −1, −1, 1, −1, −1, −3, −3, 1, 1}, {−1, −1, −3, −3, −1, −3, 3, −1, 3, −1, −1}, {1, 3, −1, −1, 1, −1, 1, 1, −3, 3, 3, 1}, {3, 1, 3, −1, −1, 1, −1, −1, −1, 3, 1}, {1, −3, −1, −3, 1, 1, −3, −3, 3, −3, −3, 1}, {3, −1, −1, −1, −3, −1, −3, 1, 1, −3, 3, −3}, and {3, 3, −1, 1, −1, 1, −3, −3, 1, −1, −3, −1}.

Optionally, an $\{s_n\}$ set that includes the sequence $\{s_n\}$ consisting of elements $s_n$ may be a subset in a seventh sequence set. All peak-to-average ratios of sequences in the seventh sequence set are less than 2.65 dB, and a value of a correlation between any cyclic shift of any sequence in the seventh sequence set and any cyclic shift of another sequence is less than 0.75.

In a specific implementation, optionally, the sequences in the seventh sequence set include:

{−3, −3, −3, −3, 1, 1, −3, −3, 1, −3, 1, −3}, {1, −3, 1, −3, 1, 1, −3, −3, 1, 1, 1, 1}, {−3, 3, 3, 1, −1, −3, 1, −3, −1, 1, 1, 3}, {−3, 1, 3, −1, 3, 1, −1, −1, −1, −1, 1, 1}, {3, 1, 3, 1, 3, 1, 3, −3, −1, −3, 3, 1}, {−3, 3, 1, 3, 1, −1, 1, 3, 1, 3, −3, 3}, {1, 3, 1, −1, 1, −1, −3, −1, 1, −1, 1, 3}, {3, −1, 3, −1, −1, −1, −1, 3, 3, −1, −1, 3}, {−3, 1, 3, −1, −3, 1, −1, −3, −3, −3, −3, −1}, {1, −1, 3, −1, 3, −3, −1, −1, 1, 1, −1, −1}, {−3, −1, −3, 3, 3, 3, −1, −3, 3, −3, −1}, {1, 3, 1, −1, 3, −1, 3, 3, 1, −1, 1, 3}, {3, 3, 3, −3, 1, 1, −3, 3, 1, 3, −1, −3}, {−3, −3, −3, 3, −1, −1, 3, −3, −1, −3, 1, 3}, {1, −1, −1, 1, −1, 1, −3, 1, 3, 3, −1, −1}, {1, −1, 1, −1, −1, 1, 3, 3, −1, −1, −3, 1}, {−3, −3, 3, −1, −1, 3, −3, −1, 3, 1, 3, 1}, {1, 3, 1, 3, 3, 1, −1, −1, 3, 3, −3, 1}, {1, −1, −1, −1, 3, 1, 1, 3, 1, −3, −1, 1}, {−1, 1, 1, 1, −3, −1, −1, −3, −1, 3, 1, −1}, {−1, 3, 3, −1, −1, 3, −1, 3, −1, −1, −1, −1}, {−1, 1, 3, −3, 3, 1, −1, −3, −1, −3, −1, −3}, {−3, 1, 3, 1, 3, −3, −3, −3, −1, 3, 3}, {−1, −3, 3, −1, −3, −3, −3, −1, −3, −3, −3, −1, 1, −1, 1, −3}, {1, 3, −3, −1, −3, −3, −3, 3, −1, −3, 3}, {−1, −3, 3, −1, −3, −3, −3, −1, −1, −3, −3, −1, −1, −1}, {1, 3, 3, −3, 3, 1, −3, −1, −3, −1, −3}, {3, −1, −1, 3, 3, 3, 3, 3, −1, 3, −1}, {−3, 1, 1, 1, −3, 1, 1, 3, 1, −3, −1, 1}, {−1, 1, 1, 1, −3, −1, −1, −3, −1, 3, 1, −1}, {−1, 3, −1, −1, −1, 3, −1, 3, 3, −1, −1, −1}, {1, −3, 1, 1, −3, −3, −3, −3, 1, −3, −3, −3}, {−1, −3, 3, −1, 3, 1, 1, 1, −3, −1, 1, 1}, {−1, 1, 1, 1, −3, −1, −1, −3, −1, 3, 1, −1}, {−1, 3, 1, 3, −3, −3, −3, 3, −1, −3, 3}, {−1, −3, 3, −1, −3, −3, −3, −1, 1, −1, 1, −3}, {−1, 1, 1, 1, −3, −1, −1, −3, −1, 3, 1, −1}, {3, 3, 3, −3, 1, 3, 3, −3, 1, −1, −3, 1}, {−3, 1, −3, −1, −1, 1, −3, −1, −1, −3, 3, 3}, {3, −1, −3, 3, −3, −1, 3, 3, 3, −1, −3}, and {−3, 1, −3, 1, 3, 3, −1, −1, −3, −3, −1, −1}.

Optionally, an $\{s_n\}$ set that includes the sequence $\{s_n\}$ consisting of elements $s_n$ may be a subset in an eighth sequence set. All peak-to-average ratios of sequences in the eighth sequence set are less than 3.0 dB, and a value of a correlation between any cyclic shift of any sequence in the eighth sequence set and any cyclic shift of another sequence is less than 0.75.

In a specific implementation, optionally, the sequences in the eighth sequence set include:

{−3, −3, −3, −3, 1, 1, −3, −3, 1, −3, 1, −3}, {1, −3, 1, −3, 1, 1, −3, −3, 1, 1, 1, 1}, {−3, 3, 3, 1, −1, −3, 1, −3, −1, 1, 1, 3}, {−3, 1, 3, −1, 3, 1, −1, −1, −1, −1, 1, 1}, {3, 1, 3, 1, 3, 1, 3, −3, −1, −3, 3, 1}, {−3, 3, 1, 3, 1, −1, 1, 3, 1, 3, −3, 3}, {1, 3, 1, −1, 1, −1, −3, −1, 1, −1, 1, 3}, {3, −1, 3, −1, −1, −1, −1, 3, 3, −1, −1, 3}, {−1, 3, 3, −1, −1, 3, −1, 3, −1, −1, −1, −1}, {1, −1, 3, −1, 3, −3, −1, −1, 1, 1, −1, −1}, {−3, −1, −3, 3, 3, 3, −1, −3, 3, −3, −1}, {1, 3, 1, −1, 3, −1, 3, 3, 1, −1, 1, 3}, {1, −1, 1, −1, −1, 1, 3, 3, −1, −1, −3, 1}, {1, 3, 1, 3, 3, 1, −1, −1, 3, 3, −3, 1}, {−3, 1, 3, 1, 3, −3, −3, −3, 3, −1, −3, 3}, {−1, −3, 3, −1, −3, −3, −3, −1, 1, −1, 1, −3}, {−1, 1, 1, −3, 3, 1, −1, −3, −1, −3, −1, −3}, {−1, 3, 3, −1, −1, 3, −1, 3, −1, −1, −1, −1}, {−3, 1, 3, 1, 3, −3, −3, −3, 3, −1, −3, 3}, {−1, 1, 3, −3, 3, 1, −1, −3, −1, −3, −1, −3}, {−3, 1, 3, 1, 3, −3, −3, −3, −1, 3, 3}, {−1, −3, 3, −1, −3, −3, −3, −1, 1, −1, 1, −3}, {−1, 1, 3, −3, 3, 1, −1, −3, −1, −3, −1, −3}, {−3, 1, 3, 1, 3, −3, −3, −3, −1, 1, −1, 1, −3}, {−3, 1, 3, 1, 3, −3, −3, −3, 3, −1, −3, 3}, {−1, −3, 3, −1, −3, −3, −3, −1, 1, −1, 1, −3}, {−1, 1, 3, −3, 3, 1, −1, −3, −1, −3, −1, −3}, {−3, 1, 3, 1, 3, −3, −3, −3, 3, −1, −3, 3}, {−1, −3, 3, −1, −3, −3, −3, −1, 1, −1, 1, −3}, {3, 1, −1, 3, −1, −1, −3, −3, −1, −1}, {−1, −1, −1, 1, 3, −1, 1, −1, 3, −1, −3, 3}, {3, 3, 3, 1, −1, −1, 3, 1, −3, 1, 3, −3},

{3, −1, −3, −1, 1, 3, −3, −1, −3, −3, −3, 3}, {1, 3, −1, −3, −1, −3, 1, −3, −3, 1, −1, −1}, {−1, −3, 1, 3, 1, 3, −1, 3, 3, −1, 1, 1}, {−1, −1, 1, 1, −1, 1, −1, −1, 3, −3, 3, −1}, {1, 3, 3, −3, 3, 3, −3, 3, 1, 1, −1, −3}, {3, 3, 3, −3, −3, −3, 1, 3, 3, −1, 1, −3}, {−3, −1, 1, 1, 3, −3, 3, 3, −3, 3, 3, 1}, {1, −3, 3, 1, 1, −3}, {−3, −1, −3, −1, −3, −3, −1}, {−1, 3, 3, 1, −1, 1, 3, −1, −1, 1, −1, 1}, {−1, 1, −3, −1, −1, −3, 1, 1, 1, 3, −1, −3}, {−3, −1, −3, 3, −1, 1, −1, 3, −3, −1, −3, −3}, {−1, 3, 3, 3, −3, 1, 1, 3, −1, 3, 3, 1}, {−1, 1, −3, −3, 3, 3, −3, 1, −3, 3, −3, −3}, {1, −3, −1, −3, −3, −3, −1, 3, 1, −3, −3, −1}, {−3, −1, −1, 1, 1, 1, −1, 3, −3, 1, 1, −1}, {3, 1, −3, −3, −1, −1, −3, 1, −3, −1, −3}, {3, 1, 3, 1, −1, 1, 3, 1, 3, −3, −1, −3}, {3, 1, 3, −1, −1, 1, −1, 1, −1, −1, 3, 1}, {3, 1, 3, 3, −1, 1, −1, 1, −1, 3, 3, 1}, {3, 3, −1, 1, −1, 1, −3, −3, 1, −1, −3, −1}, {−1, −3, −3, −1, 1, −1, 1, 3, −1, −3, 1, 3}, {−3, 1, −1, 1, −3, −1, 3, 3, 1, −3, −3, −1}, {−3, 1, 3, 1, −3, 3, −1, −1, 1, −3, −3, 3}, {−3, 1, 3, 1, 1, 3, 1, −3, 3, −1, −1, −3}, and {1, −1, −1, 3, −3, −3, 1, −1, 3, 1, 3, −1}.

Based on the sequence-based signal processing method disclosed in this embodiment of this application, an equivalent sequence in the foregoing related sequence sets may be expressed as $\{q_n\}$. An element $q_n$ in the equivalent sequence $\{q_n\}$ meets $q_n = s_n + u_n \pmod 8$.

In a specific implementation, optionally, sequences $\{u_n\}$ consisting of elements $u_n$ include:

{1, 1, 1, 1, 1, 1, 1, 1, 1, 1, 1, 1}, {1, 3, 5, 7, 1, 3, 5, 7, 1, 3, 5, 7}, {1, 7, 5, 3, 1, 7, 5, 3, 1, 7, 5, 3}, {1, 5, 1, 5, 1, 5, 1, 5, 1, 5, 1, 5}, {3, 1, 7, 5, 3, 1, 7, 5, 3, 1, 7, 5}, {3, 3, 3, 3, 3, 3, 3, 3, 3, 3, 3, 3}, {3, 5, 7, 1, 3, 5, 7, 1, 3, 5, 7, 1}, {3, 7, 3, 7, 3, 7, 3, 7, 3, 7, 3, 7}, {5, 1, 5, 1, 5, 1, 5, 1, 5, 1, 5, 1}, {5, 3, 1, 7, 5, 3, 1, 7, 5, 3, 1, 7}, {5, 5, 5, 5, 5, 5, 5, 5, 5, 5, 5, 5}, {5, 7, 1, 3, 5, 7, 1, 3, 5, 7, 1, 3}, {7, 1, 3, 5, 7, 1, 3, 5, 7, 1, 3, 5}, {7, 3, 7, 3, 7, 3, 7, 3, 7, 3, 7, 3}, {7, 5, 3, 1, 7, 5, 3, 1, 7, 5, 3, 1}, and {7, 7, 7, 7, 7, 7, 7, 7, 7, 7, 7, 7}.

According to the sequence-based signal processing method provided in this embodiment of this application, a sequence meeting a requirement for sending a signal by using a PUCCH is determined. The sequence is a sequence $\{f_n\}$ consisting of 12 elements, $f_n$ represents an element in the sequence $\{f_n\}$, and the determined sequence $\{f_n\}$ is a sequence meeting a preset condition. Then, the 12 elements in the sequence $\{f_n\}$ are respectively mapped to 12 subcarriers, to generate a first signal, and the first signal is sent. By using the determined sequence, when the signal is sent by using the PUCCH, a low correlation between sequences can be maintained, and a relatively small PAPR value and a relatively small CM value can be maintained. Therefore, a requirement of a communication application environment in which the signal is sent by using the PUCCH is met.

Based on the sequence-based signal processing method disclosed in this embodiment of this application, an embodiment of this application further discloses a communications device and a communications system that perform the sequence-based signal processing method.

Figure 6:
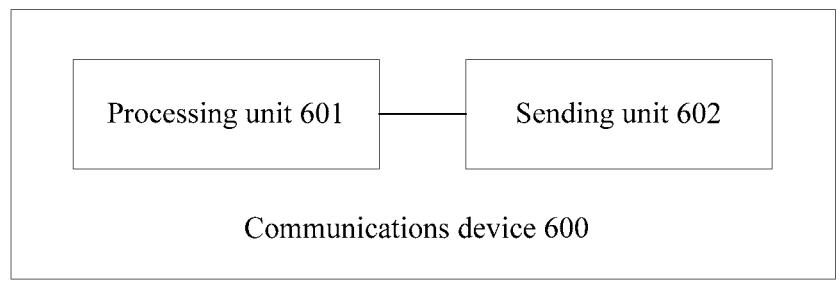
FIG. 6 is a schematic structural diagram of a terminal according to an embodiment of this application.

As shown in FIG. 6, FIG. 6 is a schematic structural diagram of a communications device 600 according to an embodiment of this application. The communications device 600 includes a processing unit 601 and a sending unit 602.

The processing unit 601 is configured to: determine a sequence $\{f_n\}$ consisting of 12 elements, where $f_n$ represents an element in the sequence $\{f_n\}$, the sequence $\{f_n\}$ is a sequence meeting a preset condition; and respectively map the 12 elements in the sequence $\{f_n\}$ to 12 subcarriers, to generate a first signal.

For the preset condition related to the processing unit 601, refer to the preset condition disclosed in the sequence-based signal processing method disclosed in the foregoing embodiment of this application. The preset conditions are consistent, and details are not described herein again.

The sending unit 602 is configured to send the first signal.

For a corresponding operation related to the communications device disclosed in this embodiment of this application, refer to the corresponding operation performed by the terminal in FIG. 1 in the foregoing embodiment of this application. Details are not described herein again.

With reference to the sequence-based signal processing method disclosed in this embodiment of this application, alternatively, the communications device disclosed in this embodiment of this application may be implemented directly by using a memory executed by hardware, or a memory executed by a processor, or by using a combination thereof.

Figure 7:
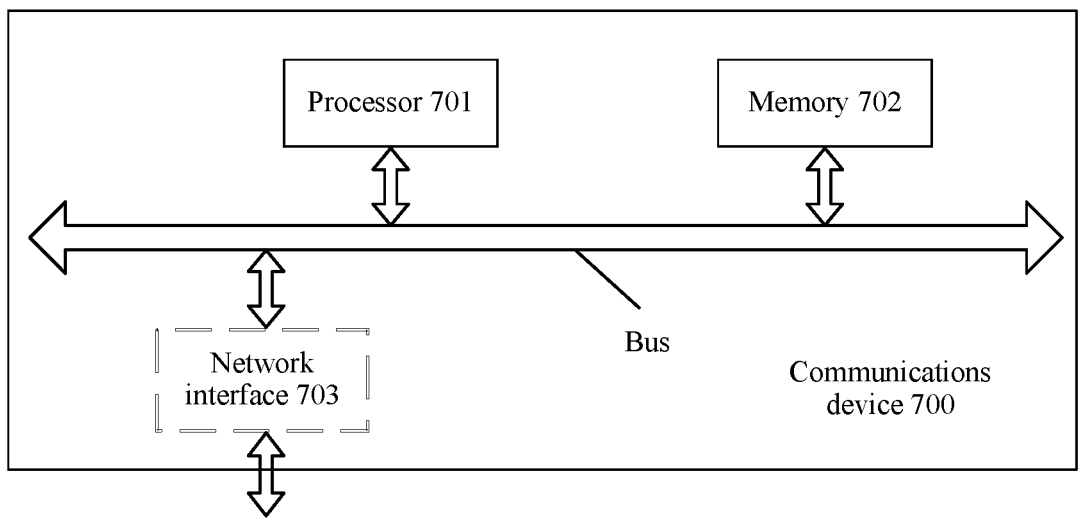
FIG. 7 is a schematic structural diagram of another terminal according to an embodiment of this application.

As shown in FIG. 7, the communications device 700 includes a processor 701 and a memory 702. Optionally, the terminal device 700 further includes a network interface 703.

The processor 701 is coupled to the memory 702 by using a bus. The processor 701 is coupled to the network interface 703 by using a bus.

The processor 701 may be specifically a central processing unit (CPU), a network processor (NP), an application-specific integrated circuit (ASIC), or a programmable logic device (PLD). The PLD may be a complex programmable logical device (CPLD), a field-programmable gate array (FPGA), or generic array logic (GAL).

The memory 702 may be specifically a content-addressable memory (CAM) or a random-access memory (RAM). The CAM may be a ternary content-addressable memory (TCAM).

The network interface 703 may be a wired interface, for example, a fiber distributed data interface (FDDI) or an Ethernet interface.

Alternatively, the memory 702 may be integrated into the processor 701. If the memory 702 and the processor 701 are mutually independent components, the memory 702 is connected to the processor 701. For example, communication between the memory 702 and the processor 701 may be performed by using a bus. Communication between the network interface 703 and the processor 701 may be performed by using a bus. Alternatively, the network interface 703 may be directly connected to the processor 701.

The memory 702 is configured to store an operating program, code, or an instruction for sequence-based signal processing. Optionally, the memory 702 includes an operating system and an application program and is configured to store an operating program, code, or an instruction for sequence-based signal processing.

When the processor 701 or a hardware device needs to perform an operation related to sequence-based signal processing, the processor 701 or the hardware device may invoke and execute the operating program, the code, or the instruction stored in the memory 702, to complete a sequence-based signal processing process performed by the terminal in FIG. 1 to FIG. 6. For a specific process, refer to a corresponding part in the foregoing embodiment of this application. Details are not described herein again.

It may be understood that FIG. 7 merely shows a simplified design of the communications device. In an actual application, the communications device may include any quantity of interfaces, processors, memories, and the like. All communications devices that can implement this embodiment of this application fall within the protection scope of this embodiment of this application.

Figure 8:
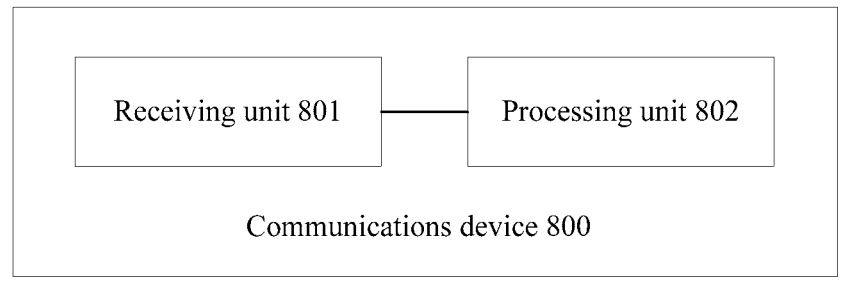
FIG. 8 is a schematic structural diagram of a network device according to an embodiment of this application.

As shown in FIG. 8, FIG. 8 is a schematic structural diagram of a communications device 800 according to an embodiment of this application. The communications device 800 includes a receiving unit 801 and a processing unit 802.

The receiving unit 801 is configured to receive a first signal carried on 12 subcarriers, and obtain 12 elements in a sequence $\{f_n\}$. The first signal is generated by respectively mapping the 12 elements to the 12 subcarriers based on the sequence $\{f_n\}$ consisting of the 12 elements, $f_n$ represents an element in the sequence $\{f_n\}$, and the sequence $\{f_n\}$ is a sequence meeting a preset condition.

For the preset condition related to the receiving unit 801, refer to the preset condition disclosed in the sequence-based signal processing method disclosed in the foregoing embodiment of this application. The preset conditions are consistent, and details are not described herein again.

The processing unit 802 is configured to process the first signal based on the 12 elements in the sequence $\{f_n\}$.

For a corresponding operation related to the communications device disclosed in this embodiment of this application, refer to the corresponding operation performed by the network device in FIG. 1 in the foregoing embodiment of this application. Details are not described herein again.

With reference to the sequence-based signal processing method disclosed in this embodiment of this application, alternatively, the communications device disclosed in this embodiment of this application may be implemented directly by using a memory executed by hardware, or a memory executed by a processor, or by using a combination thereof.

Figure 9:
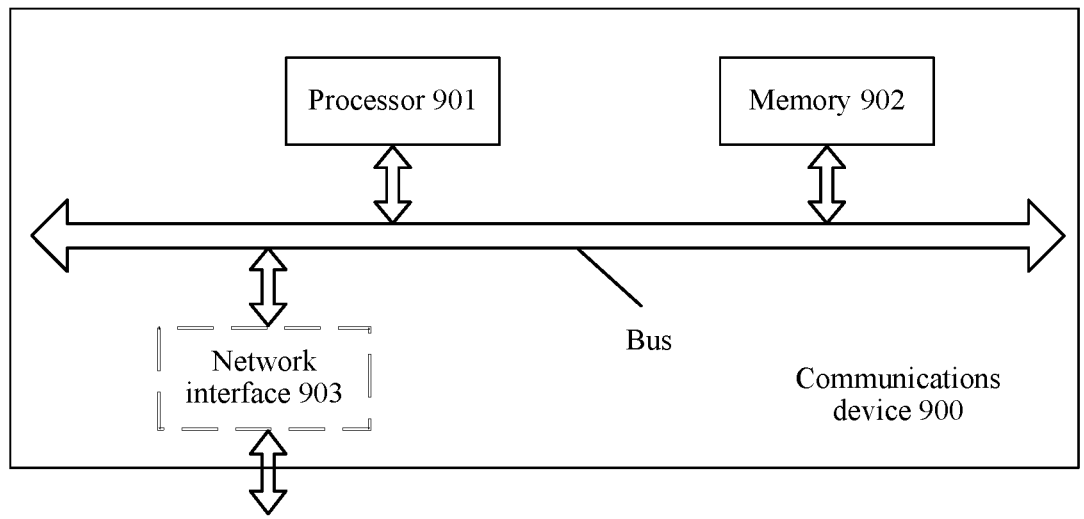
FIG. 9 is a schematic structural diagram of another network device according to an embodiment of this application.

As shown in FIG. 9, the communications device 900 includes a processor 901 and a memory 902. Optionally, the communications device 900 further includes a network interface 903.

The processor 901 is coupled to the memory 902 by using a bus. The processor 901 is coupled to the network interface 903 by using a bus.

The processor 901 may be specifically a CPU, an NP, an ASIC, or a PLD. The PLD may be a CPLD, an FPGA, or a GAL.

The memory 902 may be specifically a CAM or a RAM. The CAM may be a TCAM.

The network interface 903 may be a wired interface, for example, an FDDI or an Ethernet interface.

Alternatively, the memory 902 may be integrated into the processor 901. If the memory 902 and the processor 901 are mutually independent components, the memory 902 is connected to the processor 901. For example, communication between the memory 902 and the processor 901 may be performed by using a bus. Communication between the network interface 903 and the processor 901 may be performed by using a bus. Alternatively, the network interface 903 may be directly connected to the processor 901.

The memory 902 is configured to store an operating program, code, or an instruction for sequence-based signal processing. Optionally, the memory 902 includes an operating system and an application program and is configured to store an operating program, code, or an instruction for sequence-based signal processing.

When the processor 901 or a hardware device needs to perform an operation related to sequence-based signal processing, the processor 901 or the hardware device may invoke and execute the operating program, the code, or the instruction stored in the memory 902, to complete a sequence-based signal processing process performed by the network device in FIG. 1 to FIG. 5. For a specific process, refer to a corresponding part in the foregoing embodiment of this application. Details are not described herein again.

It may be understood that FIG. 9 merely shows a simplified design of the communications device. In an actual application, the communications device may include any quantity of interfaces, processors, memories, and the like. All communications devices that can implement this embodiment of this application fall within the protection scope of this embodiment of this application.

Figure 10:
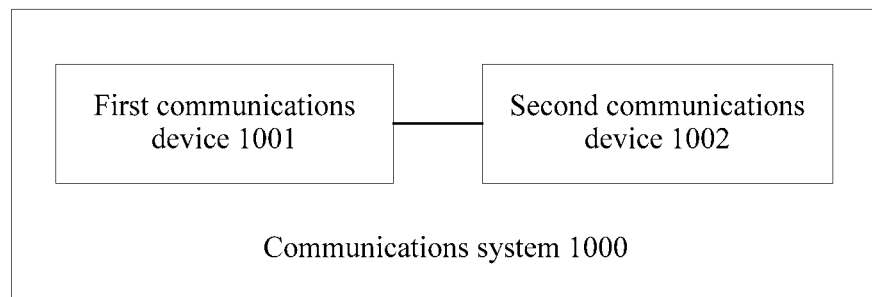
FIG. 10 is a schematic structural diagram of a communications system according to an embodiment of this application.

FIG. 10 is a communications system 1000 disclosed in an embodiment of this application. The communications system 1000 includes a first communications device 1001 and a second communications device 1002. The first communications device 1001 is a device on a transmitter side, and the second communications device 1002 is a device on a receiver side.

The first communications device 1001 is configured to: determine a sequence $\{f_n\}$ consisting of 12 elements; respectively map the 12 elements in the sequence $\{f_n\}$ to 12 subcarriers, to generate a first signal; and send the first signal to the second communications device 1002.

The second communications device 1002 is configured to: receive the first signal on the 12 subcarriers that is sent by the first communications device, obtain the 12 elements in the sequence $\{f_n\}$, and process the first signal based on the 12 elements in the sequence $\{f_n\}$.

In the foregoing communications system disclosed in this embodiment of this application, a quantity of first communications devices 1001 and a quantity of second communications devices 1002 are not limited. The first communications device 1001 may be specifically the communications devices disclosed in FIG. 6 and FIG. 7. Optionally, the first communications device 1001 may be configured to perform corresponding operations performed by the terminals related to FIG. 1 to FIG. 5 in the embodiments of this application. The second communications device 1002 may be specifically the communications devices disclosed in FIG. 8 and FIG. 9. Optionally, the second communications device 1002 may be configured to perform corresponding operations performed by the network devices related to FIG. 1 to FIG. 5 in the embodiments of this application. For a specific process and an execution principle, refer to the foregoing description. Details are not described herein again.

Persons skilled in the art should be aware that in the foregoing one or more examples, functions described in this application may be implemented by hardware, software, firmware, or any combination thereof. When being implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The embodiments in this specification are all described in a progressive manner, for same or similar parts in the embodiments, refer to these embodiments, and each embodiment focuses on a difference from other embodiments. Especially, apparatus and system embodiments are basically similar to the method embodiments, and therefore are described briefly; for related parts, refer to partial descriptions in the method embodiment.

Finally, it should be noted that the foregoing embodiments are merely examples intended for describing the technical solutions of this application other than limiting this application. Although this application and benefits of this application are described in detail with reference to the foregoing embodiments, persons of ordinary skill in the art should understand that they may still make modifications to the technical solutions described in the foregoing embodiments or make equivalent replacements to some technical features thereof, without departing from the scope of the claims of this application.

The invention claimed is:

1. A method comprising:
receiving, by a network device, a first signal occupying 12 subcarriers; and
processing, by the network device, the first signal based on a sequence $\{f_n\}$, wherein $f_n$ is an element in the sequence $\{f_n\}$, $f_n$ meets $f_n = x_n \cdot \exp(2\pi \cdot j \cdot a \cdot n)$, $0 \le n \le 11$, n is an integer, a is a real number, $x_n = \exp(\pi \cdot j \cdot s_n/4)$, $s_n$ is an element sequence in a sequence $\{s_n\}$ consisting of 12 elements, the sequence $\{s_n\}$ is one of the following sequences: $\{-1, -3, 3, -1, -3, -3, -3, -1, 1, -1, 1, -3\}$, $\{-1, 1, 3, -3, 1, -1, 1, -1, -1, -3, 1, -1\}$, $\{-3, -1, 3, -3, -3, -1, -3, 1, -1, -3, 3, 3\}$, $\{-3, -3, 3, -3, -1, 3, 3, 3, -1, -3, 1, -3\}$, $\{-3, -1, -1, -3, -3, -1, -3, 3, 1, 3, -1, -3\}$, $\{3, -1, -3, 3, -3, -1, 3, 3, 3, -3, -1, -3\}$, $\{-3, -1, 3, 1, -3, -1, -3, 3, 1, 3, 3, 1\}$, and $\{1, -1, 3, -1, -1, -1, -3, -1, 1, 1, 1, -3\}$.

2. The method according to claim 1, wherein the 12 subcarriers are consecutive.

3. The method according to claim 1, wherein the 12 subcarriers are non-consecutive and equally spaced.

4. The method according to claim 1, wherein the first signal is a reference signal.

5. The method according to claim 1, wherein the first signal carries uplink control information (UCI).

6. An apparatus comprising:
a storage medium including executable instructions; and
a processor coupled to the storage medium;
wherein the executable instructions, when executed by the processor, cause the apparatus to:
receive a first signal occupying 12 subcarriers; and
process the first signal based on a sequence $\{f_n\}$, wherein $f_n$ is an element in the sequence $\{f_n\}$, $f_n$ meets $f_n = x_n \cdot \exp(2\pi \cdot j \cdot a \cdot n)$, $0 \le n \le 11$, n is an integer, a is a real number, $x_n = \exp(\pi \cdot j \cdot s_n/4)$, $s_n$ is an element in a sequence $\{s_n\}$ consisting of 12 elements, the sequence $\{s_n\}$ is one of the following sequences: $\{-1, -3, 3, -1, -3, -3, -3, -1, 1, -1, 1, -3\}$, $\{-1, 1, 3, -3, 1, -1, 1, -1, -1, -3, 1, -1\}$, $\{-3, -1, 3, -3, -3, -1, -3, 1, -1, -3, 3, 3\}$, $\{-3, -3, 3, -3, -1, 3, 3, 3, -1, -3, 1, -3\}$, $\{-3, -1, -1, -3, -3, -1, -3, 3, 1, 3, -1, -3\}$, $\{3, -1, -3, 3, -3, -1, 3, 3, 3, -3, -1, -3\}$, $\{-3, -1, 3, 1, -3, -1, -3, 3, 1, 3, 3, 1\}$, and $\{1, -1, 3, -1, -1, -1, -3, -1, 1, 1, 1, -3\}$.

7. The apparatus according to claim 6, wherein the 12 subcarriers are consecutive.

8. The apparatus according to claim 6, wherein the 12 subcarriers are non-consecutive and equally spaced.

9. The apparatus according to claim 6, wherein the first signal is a reference signal.

10. The apparatus according to claim 6, wherein the first signal carries uplink control information (UCI).

11. A non-transitory computer-readable storage medium, comprising executable instructions, wherein the executable instructions, when executed by a computer, cause the computer to:
receive a first signal occupying 12 subcarriers; and
process the first signal based on a sequence $\{f_n\}$, wherein $f_n$ is an element in the sequence $\{f_n\}$, $f_n$ meets $f_n = x_n \cdot \exp(2\pi \cdot j \cdot a \cdot n)$, $0 \le n \le 11$, n is an integer, a is a real number, $x_n = \exp(\pi \cdot j \cdot s_n/4)$, $s_n$ is an element in a sequence $\{s_n\}$ consisting of 12 elements, the sequence $\{s_n\}$ is one of the following sequences: $\{-1, -3, 3, -1, -3, -3, -3, -1, 1, -1, 1, -3\}$, $\{-1, 1, 3, -3, 1, -1, 1, -1, -1, -3, 1, -1\}$, $\{-3, -1, 3, -3, -3, -1, -3, 1, -1, -3, 3, 3\}$, $\{-3, -3, 3, -3, -1, 3, 3, 3, -1, -3, 1, -3\}$, $\{-3, -1, -1, -3, -3, -1, -3, 3, 1, 3, -1, -3\}$, $\{3, -1, -3, 3, -3, -1, 3, 3, 3, -3, -1, -3\}$, $\{-3, -1, 3, 1, -3, -1, -3, 3, 1, 3, 3, 1\}$, and $\{1, -1, 3, -1, -1, -1, -3, -1, 1, 1, 1, -3\}$.

12. The non-transitory computer-readable storage medium according to claim 11, wherein the 12 subcarriers are consecutive.

13. The non-transitory computer-readable storage medium according to claim 11, wherein the 12 subcarriers are non-consecutive and equally spaced.

14. The non-transitory computer-readable storage medium according to claim 11, wherein the first signal is a reference signal.

15. The non-transitory computer-readable storage medium according to claim 11, wherein the first signal carries uplink control information (UCI).

16. A method comprising:
receiving, by a network device, a first signal occupying 12 subcarriers; and
processing, by the network device, the first signal based on a sequence $\{f_n\}$, wherein $f_n$ is an element in the sequence $\{f_n\}$, $f_n$ meets $f_n = x_n \cdot \exp(2\pi \cdot j \cdot a \cdot n)$, $0 \le n \le 11$, n is an integer, a is a real number, $x_n = u \cdot \exp(\pi \cdot j \cdot q_n/4)$, u is a non-zero complex number, $q_n$ is an element in a sequence $\{q_n\}$ consisting of 12 elements, the sequence $\{q_n\}$ is one of the following sequences:

a sequence $\{q_n\}$ of which the elements $q_n$ meeting $q_n = s_n + u_n \pmod{8}$, a sequence $\{s_n\}$ consisting of elements $s_n$ is $\{-1, -3, 3, 1, 1, 3, 3, -3, 3, -3, 1, 3\}$, and a sequence $\{u_n\}$ consisting of elements $u_n$ is $\{1, 3, 5, 7, 1, 3, 5, 7, 1, 3, 5, 7\}$;

a sequence $\{q_n\}$ of which the elements $q_n$ meeting $q_n = s_n + u_n \pmod{8}$, a sequence $\{s_n\}$ consisting of elements $s_n$ is $\{-1, 3, -1, -3, 1, 3, -3, -3, -3, 1, 1, -1\}$, and a sequence $\{u_n\}$ consisting of elements $u_n$ is $\{3, 1, 7, 5, 3, 1, 7, 5, 3, 1, 7, 5\}$;

a sequence $\{q_n\}$ consisting of elements $q_n$ meeting $q_n = s_n + u_n \pmod{8}$, a sequence $\{s_n\}$ consisting of elements $s_n$ is $\{3, -1, -1, 3, 3, 3, 3, 3, -1, 3, -1\}$, and a sequence $\{u_n\}$ consisting of elements $u_n$ is $\{1, 3, 5, 7, 1, 3, 5, 7\}$;

a sequence $\{q_n\}$ of which the elements $q_n$ meeting $q_n = s_n + u_n \pmod{8}$, a sequence $\{s_n\}$ consisting of elements $s_n$ is $\{3, 1, -3, 1, 3, 1, -1, -1, 1, 3, 3, 3\}$, and a sequence $\{u_n\}$ consisting of elements $u_n$ is $\{3, 5, 7, 1, 3, 5, 7, 1, 3, 5, 7, 1\}$;

a sequence $\{q_n\}$ of which the elements $q_n$ meeting $q_n = s_n + u_n \pmod{8}$, a sequence $\{s_n\}$ consisting of elements $s_n$ is $\{1, -3, -1, 3, -1, -3, 3, 1, 1, 3, -3, -3\}$, and a sequence $\{u_n\}$ consisting of elements $u_n$ is $\{5, 1, 5, 1, 5, 1, 5, 1, 5, 1, 5, 1\}$;

a sequence $\{q_n\}$ of which the elements $q_n$ meeting $q_n = s_n + u_n \pmod{8}$, a sequence $\{s_n\}$ consisting of elements $s_n$ is $\{1, -3, 1, -1, -3, 1, 3, -3, 3, 3, 3, -3\}$, and a sequence $\{u_n\}$ consisting of elements $u_n$ is $\{5, 3, 1, 7, 5, 3, 1, 7, 5, 3, 1, 7\}$;

a sequence $\{q_n\}$ of which the elements $q_n$ meeting $q_n = s_n + u_n \pmod{8}$, a sequence $\{s_n\}$ consisting of elements $s_n$ is $\{-1, -1, -1, -3, 3, -1, -3, -1, 3, -1, 1, 3\}$, and a sequence $\{u_n\}$ consisting of elements $u_n$ is $\{7, 5, 3, 1, 7, 5, 3, 1, 7, 5, 3, 1\}$;

a sequence $\{q_n\}$ of which the elements $q_n$ meeting $q_n=s_n+u_n \pmod 8$, a sequence $\{s_n\}$ consisting of elements $s_n$ is $\{3, -3, -1, 1, 1, -3, 3, 3, -3, 3, -3, 3\}$, and a sequence $\{u_n\}$ consisting of elements $u_n$ is $\{3, 7, 3, 7, 3, 7, 3, 7, 3, 7, 3, 7\}$;

a sequence $\{q_n\}$ of which the elements $q_n$ meeting $q_n=s_n+u_n \pmod 8$, a sequence $\{s_n\}$ consisting of elements $s_n$ is $\{3, 1, 1, -1, 3, 1, -3, -1, 1, 3, 1, 3\}$, and a sequence $\{u_n\}$ consisting of elements $u_n$ is $\{3, 3, 3, 3, 3, 3, 3, 3, 3, 3, 3, 3\}$; and a sequence $\{q_n\}$ of which the elements $q_n$ meeting $q_n=s_n+u_n \pmod 8$, a sequence $\{s_n\}$ consisting of elements $s_n$ is $\{-1, -3, -1, -3, -1, -1, -3, 1, 1, 3, -3, -1\}$, and a sequence $\{u_n\}$ consisting of elements $u_n$ is $\{7, 7, 7, 7, 7, 7, 7, 7, 7, 7, 7, 7\}$.

17. The method according to claim 16, wherein the 12 subcarriers are consecutive.

18. The method according to claim 16, wherein the 12 subcarriers are non-consecutive and equally spaced.

19. The method according to claim 16, wherein the first signal is a reference signal.

20. The method according to claim 16, wherein the first signal carries uplink control information (UCI).

21. An apparatus comprising:
a storage medium including executable instructions; and
a processor coupled to the storage medium;
wherein the executable instructions, when executed by the processor, cause the apparatus to:
receive a first signal occupying 12 subcarriers; and
process the first signal based on a sequence $\{f_n\}$, wherein $f_n$ is an element in the sequence $\{f_n\}$, $f_n$ meets $f_n=x_n \cdot \exp(2\pi \cdot j \cdot a \cdot n)$, $0 \leq n \leq 11$, n is an integer, a is a real number, $x_n=u \cdot \exp(\pi \cdot j \cdot q_n/4)$, u is a non-zero complex number, $q_n$ is an element in a sequence $\{q_n\}$ consisting of 12 elements, the sequence $\{q_n\}$ is one of the following sequences:

a sequence $\{q_n\}$ of which the elements $q_n$ meeting $q_n=s_n+u_n \pmod 8$, a sequence $\{s_n\}$ consisting of elements $s_n$ is $\{-1, -3, 3, 1, 1, 3, 3, -3, 3, -3, 1, 3\}$, and a sequence $\{u_n\}$ consisting of elements $u_n$ is $\{1, 3, 5, 7, 1, 3, 5, 7, 1, 3, 5, 7\}$;

a sequence $\{q_n\}$ of which the elements $q_n$ meeting $q_n=s_n+u_n \pmod 8$, a sequence $\{s_n\}$ consisting of elements $s_n$ is $\{-1, 3, -1, -3, 1, 3, -3, -3, -3, 1, 1, -1\}$, and a sequence $\{u_n\}$ consisting of elements $u_n$ is $\{3, 1, 7, 5, 3, 1, 7, 5, 3, 1, 7, 5\}$;

a sequence $\{q_n\}$ consisting of elements $q_n$ meeting $q_n=s_n+u_n \pmod 8$, a sequence $\{s_n\}$ consisting of elements $\{s_n\}$ is $\{3, -1, -1, 3, 3, 3, 3, 3, -1, 3, -1\}$, and a sequence $\{u_n\}$ consisting of elements $u_n$ is $\{1, 3, 5, 7, 1, 3, 5, 7, 1, 3, 5, 7\}$;

a sequence $\{q_n\}$ of which the elements $q_n$ meeting $q_n=s_n+u_n \pmod 8$, a sequence $\{s_n\}$ consisting of elements $\{s_n\}$ is $\{3, 1, -3, 1, 3, 1, -1, -1, 1, 3, 3, 3\}$, and a sequence $\{u_n\}$ consisting of elements $u_n$ is $\{3, 5, 7, 1, 3, 5, 7, 1, 3, 5, 7, 1\}$;

a sequence $\{q_n\}$ of which the elements $q_n$ meeting $q_n=s_n+u_n \pmod 8$, a sequence $\{s_n\}$ consisting of elements $\{s_n\}$ is $\{1, -3, -1, 3, -1, -3, 3, 1, 1, 3, -3, -3\}$, and a sequence $\{u_n\}$ consisting of elements $u_n$ is $\{5, 1, 5, 1, 5, 1, 5, 1, 5, 1\}$;

a sequence $\{q_n\}$ of which the elements $q_n$ meeting $q_n=s_n+u_n \pmod 8$, a sequence $\{s_n\}$ consisting of elements $s_n$ is $\{1, -3, 1, -1, -3, 1, 3, -3, 3, 3, 3, -3\}$, and a sequence $\{u_n\}$ consisting of elements $u_n$ is $\{5, 3, 1, 7, 5, 3, 1, 7, 5, 3, 1, 7\}$;

a sequence $\{q_n\}$ of which the elements $q_n$ meeting $q_n=s_n+u_n \pmod 8$, a sequence $\{s_n\}$ consisting of elements $s_n$ is $\{-1, -1, -1, -3, 3, -1, -3, -1, 3, -1, 1, 3\}$, and a sequence $\{u_n\}$ consisting of elements $u_n$ is $\{7, 5, 3, 1, 7, 5, 3, 1, 7, 5, 3, 1\}$;

a sequence $\{q_n\}$ of which the elements $q_n$ meeting $q_n=s_n+u_n \pmod 8$, a sequence $\{s_n\}$ consisting of elements $s_n$ is $\{3, -3, -1, 1, 1, -3, 3, 3, -3, 3, -3, 3\}$, and a sequence $\{u_n\}$ consisting of elements $u_n$ is $\{3, 7, 3, 7, 3, 7, 3, 7, 3, 7, 3, 7\}$;

a sequence $\{q_n\}$ of which the elements $q_n$ meeting $q_n=s_n+u_n \pmod 8$, a sequence $\{s_n\}$ consisting of elements $s_n$ $\{3, 1, 1, -1, 3, 1, -3, -1, 1, 3, 1, 3\}$, and a sequence $\{u_n\}$ consisting of elements $u_n$ is $\{3, 3, 3, 3, 3, 3, 3, 3, 3, 3, 3, 31\}$; and a sequence $\{q_n\}$ of which the elements $q_n$ meeting $q_n=s_n+u_n \pmod 8$, a sequence $\{s_n\}$ consisting of elements $s_n$ is $\{-1, -3, -1, -3, -1, -1, -3, 1, 1, 3, -3, -1\}$, and a sequence $\{u_n\}$ consisting of elements $u_n$ is $\{7, 7, 7, 7, 7, 7, 7, 7, 7, 7, 7, 7\}$.

22. The apparatus according to claim 21, wherein the 12 subcarriers are consecutive.

23. The apparatus according to claim 21, wherein the 12 subcarriers are non-consecutive and equally spaced.

24. The apparatus according to claim 21, wherein the first signal is a reference signal.

25. The apparatus according to claim 21, wherein the first signal carries uplink control information (UCI).

26. A non-transitory computer-readable storage medium, comprising executable instructions, wherein the executable instructions, when executed by a computer, cause the computer to:
receive a first signal occupying 12 subcarriers; and
process the first signal based on a sequence $\{f_n\}$, wherein $f_n$ is an element in the sequence $\{f_n\}$, $f_n$ meets $f_n=x_n \cdot \exp(2\pi \cdot j \cdot a \cdot n)$, $0 \leq n \leq 11$, n is an integer, a is a real number, $x_n=u \cdot \exp(\pi \cdot j \cdot q_n/4)$, u is a non-zero complex number, $q_n$ is an element in a sequence $\{q_n\}$ consisting of 12 elements, the sequence $\{q_n\}$ is one of the following sequences:

a sequence $\{q_n\}$ of which the elements $q_n$ meeting $q_n=s_n+u_n \pmod 8$, a sequence $\{s_n\}$ consisting of elements $s_n$ is $\{-1, -3, 3, 1, 1, 3, 3, -3, 3, -3, 1, 3\}$, and a sequence $\{u_n\}$ consisting of elements $u_n$ is $\{1, 3, 5, 7, 1, 3, 5, 7\}$;

a sequence $\{q_n\}$ of which the elements $q_n$ meeting $q_n=s_n+u_n \pmod 8$, a sequence $\{s_n\}$ consisting of elements $s_n$ is $\{-1, 3, -1, -3, 1, 3, -3, -3, -3, 1, 1, -1\}$, and a sequence $\{u_n\}$ consisting of elements $u_n$ is $\{3, 1, 7, 5, 3, 1, 7, 5, 3, 1, 7, 5\}$;

a sequence $\{q_n\}$ consisting of elements $q_n$ meeting $q_n=s_n+u_n \pmod 8$, a sequence $\{s_n\}$ consisting of elements $s_n$ is $\{3, -1, -1, 3, 3, 3, 3, 3, 3, -1, 3, -1\}$, and a sequence $\{u_n\}$ consisting of elements $u_n$, is $\{1, 3, 5, 7, 1, 3, 5, 7\}$;

a sequence $\{q_n\}$ of which the elements $q_n$ meeting $q_n=s_n+u_n \pmod 8$, a sequence $\{s_n\}$ consisting of elements $s_n$ is $\{3, 1, -3, 1, 3, 1, -1, -1, 1, 3, 3, 3\}$, and a sequence $\{u_n\}$ consisting of elements $u_n$ is $\{3, 5, 7, 1, 3, 5, 7, 1, 3, 5, 7, 1\}$;

a sequence $\{q_n\}$ of which the elements $q_n$ meeting $q_n=s_n+u_n \pmod 8$, a sequence $\{s_n\}$ consisting of elements $s_n$ is $\{1, -3, -1, 3, -1, -3, 3, 1, 1, 3, -3, -3\}$, and a sequence $\{u_n\}$ consisting of elements $u_n$ is $\{5, 1, 5, 1, 5, 1, 5, 1, 5, 1, 5, 1\}$;

a sequence $\{q_n\}$ of which the elements $q_n$ meeting $q_n=s_n+u_n \pmod 8$, a sequence $\{s_n\}$ consisting of elements $s_n$ is $\{1, -3, 1, -1, -3, 1, 3, -3, 3, 3, 3, -3\}$, and a sequence $\{u_n\}$ consisting of elements $u_n$ is $\{5, 3, 1, 7, 5, 3, 1, 7, 5, 3, 1, 7\}$;

a sequence $\{q_n\}$ of which the elements $q_n$ meeting $q_n=s_n+u_n \pmod 8$, a sequence $\{s_n\}$ consisting of elements $s_n$ is $\{-1, -1, -1, -3, 3, -1, -3, -1, 3, -1, 1, 3\}$, and a sequence $\{u_n\}$ consisting of elements $u_n$ is $\{7, 5, 3, 1, 7, 5, 3, 1, 7, 5, 3, 1\}$;

a sequence $\{q_n\}$ of which the elements $q_n$ meeting $q_n=s_n+u_n \pmod 8$, a sequence $\{S_n\}$ consisting of elements $s_n$ is $\{3, -3, -1, 1, 1, -3, 3, 3, -3, 3, -3, 3\}$, and a sequence $\{u_n\}$ consisting of elements $u_n$ is $\{3, 7, 3, 7, 3, 7, 3, 7, 3, 7, 3, 7\}$;

a sequence $\{q_n\}$ of which the elements $q_n$ meeting $q_n=s_n+u_n \pmod 8$, a sequence $\{s_n\}$ consisting of elements $s_n$ is $\{3, 1, 1, -1, 3, 1, -3, -1, 1, 3, 1, 3\}$, and a sequence $\{u_n\}$ consisting of elements $u_n$ is $\{3, 3, 3, 3, 3, 3, 3, 3, 3, 3, 3, 3\}$; and a sequence $\{q_n\}$ of which the elements $q_n$ meeting $q_n=s_n+u_n \pmod 8$, a sequence $\{s_n\}$ consisting of elements $s_n$ is $\{-1, -3, -1, -3, -1, -1, -3, 1, 1, 3, -3, -1\}$, and a sequence $\{u_n\}$ consisting of elements $u_n$ is $\{7, 7, 7, 7, 7, 7, 7, 7, 7, 7, 7, 7\}$.

27. The non-transitory computer-readable storage medium according to claim 26, wherein the 12 subcarriers are consecutive.

28. The non-transitory computer-readable storage medium according to claim 26, wherein the 12 subcarriers are non-consecutive and equally spaced.

29. The non-transitory computer-readable storage medium according to claim 26, wherein the first signal is a reference signal.

30. The non-transitory computer-readable storage medium according to claim 26,
wherein the first signal carries uplink control information (UCI).

* * * * *

UNITED STATES PATENT AND TRADEMARK OFFICE
CERTIFICATE OF CORRECTION

Page 1 of 1

PATENT NO. : 11,757,688 B2
APPLICATION NO. : 17/734885
DATED : September 12, 2023
INVENTOR(S) : Qu et al.

It is certified that error appears in the above-identified patent and that said Letters Patent is hereby corrected as shown below:

In the Claims

Claim 1: Column 31, Line 17: "an element sequence in a sequence $\{s_n\}$ consisting of" should read -- an element in a sequence $\{s_n\}$ consisting of --.

Claim 21: Column 33, Line 49: "$\{s_n\}$" should read -- $s_n$ --.

Claim 21: Column 33, Line 54: "$\{s_n\}$" should read -- $s_n$ --.

Claim 21: Column 33, Line 59: "$\{s_n\}$" should read -- $s_n$ --.

Signed and Sealed this
Twenty-sixth Day of December, 2023

Katherine Kelly Vidal
*Director of the United States Patent and Trademark Office*